(12) United States Patent
Kasada

(10) Patent No.: US 12,308,054 B2
(45) Date of Patent: *May 20, 2025

(54) MAGNETIC TAPE HAVING CHARACTERIZED MAGNETIC LAYER SURFACE, MAGNETIC TAPE CARTRIDGE, AND MAGNETIC TAPE DEVICE

(71) Applicant: FUJIFILM Corporation, Tokyo (JP)

(72) Inventor: Norihito Kasada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,870

(22) Filed: Nov. 22, 2023

(65) Prior Publication Data

US 2024/0105224 A1    Mar. 28, 2024

Related U.S. Application Data

(63) Continuation of application No. 17/955,156, filed on Sep. 28, 2022, now Pat. No. 11,869,553.

(30) Foreign Application Priority Data

Sep. 29, 2021   (JP) .................................. 2021-158786
Aug. 29, 2022   (JP) .................................. 2022-135818

(51) Int. Cl.
G11B 5/592    (2006.01)
G11B 5/706    (2006.01)
G11B 5/735    (2006.01)

(52) U.S. Cl.
CPC ........ *G11B 5/5928* (2013.01); *G11B 5/70615* (2013.01); *G11B 5/70678* (2013.01); *G11B 5/7356* (2019.05)

(58) Field of Classification Search
None
See application file for complete search history.

(56) References Cited

U.S. PATENT DOCUMENTS 4,693,929 A   9/1987   Ryoke et al.
5,195,689 A   3/1993   Beer et al.
(Continued)

FOREIGN PATENT DOCUMENTS

JP   11-250437 A    9/1999
JP   2001-093138 A  4/2001
(Continued)

OTHER PUBLICATIONS

Office Action issued May 11, 2023 in U.S. Appl. No. 17/954,719.
(Continued)

*Primary Examiner* — Kevin M Bernatz
(74) *Attorney, Agent, or Firm* — Sughrue Mion, PLLC

(57) ABSTRACT

A magnetic tape in which an arithmetic average roughness Ra measured at a surface of the magnetic layer with an atomic force microscope is 2.0 nm or less, and in an environment with a temperature of 23° C. and a relative humidity of 50%, an AlFeSil abrasion value$_{45°}$ of a surface of the magnetic layer measured at a tilt angle of 45° of an AlFeSil prism is 20 μm to 50 μm, a standard deviation of an AlFeSil abrasion value of the surface of the magnetic layer measured at each of tilt angles of 0°, 15°, 30°, and 45° of the AlFeSil prism is 30 μm or less, and the tilt angle of the AlFeSil prism is an angle formed by a longitudinal direction of the AlFeSil prism and a width direction of the magnetic tape.

16 Claims, 6 Drawing Sheets

MAGNETIC TAPE RUNNING DIRECTION

(56) References Cited

U.S. PATENT DOCUMENTS

| | | | |
|---|---|---|---|
| 5,671,211 | A | 9/1997 | Akashi et al. |
| 6,515,827 | B1 | 2/2003 | Raymond et al. |
| 7,011,899 | B2 | 3/2006 | Kato |
| 7,755,863 | B2 | 7/2010 | Neumann et al. |
| 8,535,817 | B2 * | 9/2013 | Imaoka ............... G11B 5/7085 428/844 |
| 9,311,946 | B2 | 4/2016 | Tanaka et al. |
| 9,401,171 | B2 | 7/2016 | Kasada et al. |
| 9,711,174 | B2 | 7/2017 | Kasada et al. |
| 9,721,605 | B2 | 8/2017 | Oyanagi et al. |
| 9,721,606 | B2 | 8/2017 | Kasada |
| 9,767,835 | B2 | 9/2017 | Tanaka et al. |
| 9,984,716 | B1 | 5/2018 | Kaneko et al. |
| 10,134,433 | B2 | 11/2018 | Kasada et al. |
| 10,347,280 | B2 | 7/2019 | Kasada et al. |
| 10,373,639 | B2 | 8/2019 | Kasada et al. |
| 10,410,665 | B2 | 9/2019 | Ozawa et al. |
| 10,410,666 | B2 | 9/2019 | Kasada et al. |
| 10,431,248 | B2 | 10/2019 | Kasada et al. |
| 10,431,249 | B2 | 10/2019 | Kasada et al. |
| 10,438,628 | B2 | 10/2019 | Kasada et al. |
| 10,477,072 | B2 | 11/2019 | Kasada |
| 10,490,220 | B2 | 11/2019 | Kasada et al. |
| 10,497,388 | B2 | 12/2019 | Ozawa et al. |
| 10,515,661 | B2 | 12/2019 | Kasada et al. |
| 10,522,180 | B2 | 12/2019 | Kasada |
| 10,706,875 | B2 | 7/2020 | Kasada et al. |
| 10,720,181 | B1 | 7/2020 | Yamaga et al. |
| 10,803,904 | B1 | 10/2020 | Yamaga et al. |
| 10,811,048 | B2 | 10/2020 | Ozawa et al. |
| 10,839,849 | B2 | 11/2020 | Tada et al. |
| 10,854,233 | B2 | 12/2020 | Ozawa et al. |
| 10,984,833 | B2 | 4/2021 | Yamaga et al. |
| 11,361,792 | B2 | 6/2022 | Kasada |
| 11,423,932 | B2 | 8/2022 | Ozawa et al. |
| 11,423,934 | B2 | 8/2022 | Kasada |
| 11,495,246 | B2 | 11/2022 | Kasada et al. |
| 11,581,015 | B2 | 2/2023 | Kasada |
| 11,631,428 | B2 | 4/2023 | Kaneko et al. |
| 11,631,429 | B2 | 4/2023 | Kaneko et al. |
| 11,854,586 | B2 * | 12/2023 | Kasada ..................... G11B 5/71 |
| 11,864,033 | B2 | 1/2024 | Chauhan et al. |
| 11,869,553 | B2 * | 1/2024 | Kasada ............... G11B 5/7356 |
| 11,869,555 | B2 * | 1/2024 | Kasada ................... G11B 5/65 |
| 11,869,557 | B2 * | 1/2024 | Kasada ............... G11B 5/7356 |
| 11,869,558 | B2 * | 1/2024 | Kasada ................... G11B 5/78 |
| 11,887,251 | B2 | 1/2024 | Jutan et al. |
| 11,887,637 | B2 | 1/2024 | Kasada |
| 11,894,032 | B2 | 2/2024 | Ozawa et al. |
| 11,894,034 | B2 | 2/2024 | Kasada |
| 2001/0008714 | A1 | 7/2001 | Sueoka et al. |
| 2002/0086183 | A1 | 7/2002 | Misawa |
| 2002/0098280 | A1 | 7/2002 | Otsuka |
| 2002/0164503 | A1 | 11/2002 | Tani et al. |
| 2003/0228489 | A1 | 12/2003 | Doushita et al. |
| 2004/0066725 | A1 | 4/2004 | Usui |
| 2004/0091746 | A1 | 5/2004 | Nakamura et al. |
| 2004/0149846 | A1 | 8/2004 | Zwettler et al. |
| 2004/0151946 | A1 | 8/2004 | Kata et al. |
| 2004/0214046 | A1 | 10/2004 | Ejiri et al. |
| 2005/0053804 | A1 | 3/2005 | Kato |
| 2005/0153170 | A1 | 7/2005 | Inoue et al. |
| 2005/0196645 | A1 | 9/2005 | Doi et al. |
| 2006/0066999 | A1 | 3/2006 | Ejiri |
| 2006/0204812 | A1 | 9/2006 | Moriyama et al. |
| 2006/0208122 | A1 | 9/2006 | Sogabe et al. |
| 2007/0262189 | A1 | 11/2007 | Kubota |
| 2008/0259495 | A1 | 10/2008 | Ichikawa et al. |
| 2009/0046396 | A1 | 2/2009 | Nagata et al. |
| 2009/0086368 | A1 | 4/2009 | Kakuishi et al. |
| 2011/0274947 | A1 | 11/2011 | Ishiguro |
| 2012/0042899 | A1 | 2/2012 | Boday et al. |
| 2012/0045664 | A1 | 2/2012 | Tanaka et al. |
| 2012/0243120 | A1 * | 9/2012 | Harasawa ................. G11B 5/70 |
| 2014/0327987 | A1 | 11/2014 | Biskeborn et al. |
| 2016/0049167 | A1 | 2/2016 | Biskeborn et al. |
| 2016/0171993 | A1 | 6/2016 | Okubo |
| 2016/0189739 | A1 | 6/2016 | Kasada et al. |
| 2017/0092315 | A1 | 3/2017 | Ozawa et al. |
| 2017/0186460 | A1 | 6/2017 | Kasada et al. |
| 2017/0221516 | A1 | 8/2017 | Oyanagi et al. |
| 2017/0372740 | A1 | 12/2017 | Ozawa et al. |
| 2018/0005737 | A1 | 1/2018 | Sakane et al. |
| 2018/0147626 | A1 | 5/2018 | Shirata et al. |
| 2018/0240479 | A1 | 8/2018 | Kasada et al. |
| 2018/0240489 | A1 | 8/2018 | Kasada et al. |
| 2018/0240493 | A1 | 8/2018 | Tada et al. |
| 2018/0286442 | A1 | 10/2018 | Ozawa et al. |
| 2018/0286444 | A1 | 10/2018 | Kasada et al. |
| 2018/0286448 | A1 | 10/2018 | Ozawa et al. |
| 2018/0286451 | A1 | 10/2018 | Ozawa et al. |
| 2019/0027180 | A1 | 1/2019 | Kasada et al. |
| 2019/0027181 | A1 | 1/2019 | Ozawa et al. |
| 2019/0103130 | A1 | 4/2019 | Kasada et al. |
| 2019/0164573 | A1 | 5/2019 | Biskeborn |
| 2019/0304488 | A1 | 10/2019 | Ozawa et al. |
| 2019/0304497 | A1 | 10/2019 | Kurokawa et al. |
| 2019/0304498 | A1 | 10/2019 | Ozawa et al. |
| 2019/0304499 | A1 | 10/2019 | Kurokawa et al. |
| 2020/0005817 | A1 | 1/2020 | Ozawa et al. |
| 2020/0066302 | A1 | 2/2020 | Terakawa et al. |
| 2020/0090694 | A1 | 3/2020 | Sano et al. |
| 2020/0098390 | A1 | 3/2020 | Terakawa et al. |
| 2020/0251136 | A1 | 8/2020 | Ozawa et al. |
| 2020/0251138 | A1 | 8/2020 | Ozawa et al. |
| 2020/0279580 | A1 | 9/2020 | Sano et al. |
| 2020/0302962 | A1 | 9/2020 | Sawayashiki et al. |
| 2020/0312361 | A1 | 10/2020 | Kasada |
| 2020/0342903 | A1 | 10/2020 | Kasada |
| 2020/0342906 | A1 | 10/2020 | Kasada |
| 2020/0342907 | A1 | 10/2020 | Yamaga et al. |
| 2020/0365178 | A1 | 11/2020 | Kasada |
| 2020/0365179 | A1 | 11/2020 | Kasada |
| 2021/0012800 | A1 | 1/2021 | Yamaga et al. |
| 2021/0287702 | A1 | 9/2021 | Ozawa et al. |
| 2021/0375311 | A1 | 12/2021 | Ozawa et al. |
| 2021/0407540 | A1 | 12/2021 | Sekiguchi et al. |
| 2022/0020392 | A1 | 1/2022 | Kurokawa et al. |
| 2022/0028421 | A1 | 1/2022 | Kaneko et al. |
| 2022/0028422 | A1 | 1/2022 | Kaneko et al. |
| 2022/0208227 | A1 | 6/2022 | Yamaga |
| 2022/0254375 | A1 | 8/2022 | Kaneko et al. |
| 2022/0270642 | A1 | 8/2022 | Yamaga et al. |
| 2022/0270644 | A1 | 8/2022 | Kurokawa et al. |
| 2022/0358958 | A1 | 11/2022 | Kasada et al. |
| 2022/0358961 | A1 | 11/2022 | Kasada et al. |
| 2022/0366935 | A1 | 11/2022 | Kasada et al. |
| 2023/0103135 | A1 | 3/2023 | Ismail et al. |
| 2023/0103562 | A1 | 4/2023 | Kasada |
| 2023/0104145 | A1 | 4/2023 | Kasada |
| 2023/0104452 | A1 | 4/2023 | Kasada |
| 2023/0106585 | A1 | 4/2023 | Kasada |
| 2023/0109470 | A1 | 4/2023 | Kasada |
| 2023/0110514 | A1 | 4/2023 | Kasada |
| 2023/0115333 | A1 | 4/2023 | Kasada |
| 2023/0123823 | A1 | 4/2023 | Kasada |
| 2023/0238025 | A1 | 7/2023 | Ozawa et al. |
| 2024/0020393 | A1 * | 1/2024 | Mehta ..................... G06F 21/602 |
| 2024/0096363 | A1 * | 3/2024 | Kasada ................... G11B 5/588 |
| 2024/0096366 | A1 * | 3/2024 | Kasada ............... G11B 5/7085 |
| 2024/0096367 | A1 * | 3/2024 | Kasada ............... G11B 5/7028 |
| 2024/0105228 | A1 | 3/2024 | Kasada |
| 2024/0105229 | A1 * | 3/2024 | Kasada ............... G11B 5/7356 |
| 2024/0112697 | A1 * | 4/2024 | Kurokawa ........... G11B 5/7085 |
| 2024/0170014 | A1 | 5/2024 | Kasada |
| 2024/0203451 | A1 | 6/2024 | Kasada |
| 2024/0221791 | A1 * | 7/2024 | Kasada ................... G11B 5/708 |
| 2024/0304215 | A1 * | 9/2024 | Sato ..................... G11B 5/7356 |

(56) References Cited

U.S. PATENT DOCUMENTS

| | | | | |
|---|---|---|---|---|
| 2024/0321309 A1* | 9/2024 | Kasada | ................. | G11B 5/735 |
| 2024/0355355 A1* | 10/2024 | Kasada | ................. | G11B 5/735 |

FOREIGN PATENT DOCUMENTS

| | | | |
|---|---|---|---|
| JP | 2002-269711 | | 9/2002 |
| JP | 2002-367151 | A | 12/2002 |
| JP | 2003-022520 | | 1/2003 |
| JP | 2004-005795 | | 1/2004 |
| JP | 2004-055137 | | 2/2004 |
| JP | 2004-288332 | A | 10/2004 |
| JP | 2005-085305 | | 3/2005 |
| JP | 2005-222598 | A | 8/2005 |
| JP | 2005-259198 | | 9/2005 |
| JP | 2005-276285 | | 10/2005 |
| JP | 2006-079691 | | 3/2006 |
| JP | 2006-277838 | A | 10/2006 |
| JP | 2006-286114 | A | 10/2006 |
| JP | 2007-179680 | | 7/2007 |
| JP | 2009-087468 | | 4/2009 |
| JP | 2010-192065 | | 9/2010 |
| JP | 2010-218651 | | 9/2010 |
| JP | 2010-264683 | | 11/2010 |
| JP | 2011-084036 | | 4/2011 |
| JP | 2011-134372 | | 7/2011 |
| JP | 2012-043495 | | 3/2012 |
| JP | 2016-110680 | | 6/2016 |
| JP | 2016-524774 | A | 8/2016 |
| JP | 6010181 | | 10/2016 |
| JP | 2017-139044 | | 8/2017 |
| JP | 2017-168178 | | 9/2017 |
| JP | 2018-092693 | | 6/2018 |
| JP | 2018-170051 | | 11/2018 |
| JP | 2018-170053 | | 11/2018 |
| JP | 2018-181396 | | 11/2018 |
| JP | 6590102 | B1 | 10/2019 |
| JP | 2020-009522 | | 1/2020 |
| JP | 2021-034096 | | 3/2021 |
| JP | 2022-127014 | A | 8/2022 |
| WO | 2018199105 | | 11/2018 |
| WO | 2018203468 | | 11/2018 |
| WO | 2019159466 | | 8/2019 |

OTHER PUBLICATIONS

Office Action issued May 11, 2023 in U.S. Appl. No. 17/955,045.
Office Action issued May 11, 2023 in U.S. Appl. No. 17/955,035.
Office Action issued May 11, 2023 in U.S. Appl. No. 17/955,044.
Notice of Allowance issued Oct. 12, 2023 in U.S. Appl. No. 17/954,719.
Notice of Allowance issued Oct. 18, 2023 in U.S. Appl. No. 17/955,035.
Notice of Allowance issued Oct. 18, 2023 in U.S. Appl. No. 17/955,044.
Notice of Allowance issued Oct. 18, 2023 in U.S. Appl. No. 17/955,045.
Office Action issued Dec. 27, 2024 in U.S. Appl. No. 18/467,426.
Office Action issued Dec. 6, 2024 in U.S. Appl. No. 18/680,257.
Machine English Translation of JP2002-222515 A (H. Hitoshi et al, inventors)(2002).
Office Action issued Aug. 19, 2024 in U.S. Appl. No. 18/498,739.
Office Action issued Aug. 19, 2024 in U.S. Appl. No. 18/516,455.
Office Action issued Aug. 19, 2024 in U.S. Appl. No. 18/517,638.
Office Action issued Aug. 19, 2024 in U.S. Appl. No. 18/516,132.
Office Action issued Aug. 19, 2024 in U.S. Appl. No. 18/421,433.
International Preliminary Report on Patentability (With Translation of Written Opinion) dated Jan. 18, 2024 in Application No. PCT/JP2022/028292.
International Search Report dated Sep. 20, 2022 in Application No. PCT/JP2022/028292.
Written Opinion of the International Searching Authority dated Sep. 20, 2022 in Application No. PCT/JP2022/028292.
International Preliminary Report on Patentability dated Jan. 18, 2024 with a Translation of the Written Opinion of the International Searching Authority in Application No. PCT/JP2022/028291.
International Preliminary Report on Patentability dated Mar. 28, 2023 with a Translation of the Written Opinion of the International Searching Authority in Application No. PCT/JP2021/034157.
International Search Report issued Nov. 30, 2021 in International Application No. PCT/JP2021/034157.
International Search Report issued Sep. 20, 2022 in International Application No. PCT/JP2022/028291.
Notice of Allowance issued Apr. 18, 2022 in U.S. Appl. No. 17/399,241.
Notice of Allowance issued Apr. 22, 2020 in U.S. Appl. No. 16/367,918.
Notice of Allowance issued Aug. 16, 2023 in U.S. Appl. No. 18/191,983.
Notice of Allowance issued Dec. 19, 2022 in U.S. Appl. No. 17/378,782.
Notice of Allowance issued Dec. 19, 2022 in U.S. Appl. No. 17/378,783.
Notice of Allowance Issued Feb. 11, 2022 in U.S. Appl. No. 16/777,368.
Notice of Allowance issued Feb. 24, 2022 in U.S. Appl. No. 16/857,502.
Notice of Allowance issued Feb. 3, 2022 in U.S. Appl. No. 16/874,170.
Notice of Allowance issued Feb. 4, 2022 in U.S. Appl. No. 16/825,425.
Notice of Allowance issued Feb. 8, 2022 in U.S. Appl. No. 16/777,418.
Notice of Allowance issued Feb. 9, 2022 in U.S. Appl. No. 16/368,199.
Notice of Allowance issued Jun. 2, 2021 in U.S. Appl. No. 16/777,418.
Notice of Allowance issued Mar. 14, 2022 in U.S. Appl. No. 17/329,275.
Notice of Allowance issued Mar. 31, 2021 in U.S. Appl. No. 16/777,368.
Notice of Allowance issued May 21, 2021 in U.S. Appl. No. 16/777,368.
Notice of Allowance issued Oct. 1, 2021 in U.S. Appl. No. 16/777,368.
Notice of Allowance issued Oct. 21, 2022 in U.S. Appl. No. 16/777,418.
Notice of Allowance issued Oct. 21, 2022 in U.S. Appl. No. 16/857,502.
Notice of Allowance issued Oct. 24, 2023 in U.S. Appl. No. 17/955,251.
Notice of Allowance issued Sep. 9, 2021 in U.S. Appl. No. 16/857,502.
Office Action issued Apr. 19, 2021 in U.S. Appl. No. 16/857,502.
Office Action issued Apr. 8, 2021 in U.S. Appl. No. 16/368,199.
Office Action issued Aug. 19, 2024 in U.S. Appl. No. 18/422,850.
Office Action issued Aug. 19, 2024 in U.S. Appl. No. 18/524,342.
Office Action issued Aug. 19, 2024 in U.S. Appl. No. 18/524,922.
Office Action issued Aug. 25, 2022 in U.S. Appl. No. 17/378,782.
Office Action issued Aug. 25, 2022 in U.S. Appl. No. 17/378,783.
Office Action issued Dec. 15, 2020 in U.S. Appl. No. 16/777,368.
Office Action issued Feb. 16, 2021 in U.S. Appl. No. 16/777,418.
Office Action issued Jan. 11, 2022 in Japanese Application No. 2019-054337, corresponds to U.S. Appl. No. 16/825,425.
Office Action issued Jan. 11, 2022 in Japanese Application No. 2019-064370, corresponds to U.S. Appl. No. 16/831,158.
Office Action issued Jan. 3, 2022 in U.S. Appl. No. 17/399,241.
Office Action issued Jul. 21, 2020 in U.S. Appl. No. 16/777,418.
Office Action issued Jul. 22, 2020 in U.S. Appl. No. 16/777,368.
Office Action issued Mar. 3, 2022 in U.S. Appl. No. 17/378,782.
Office Action issued Mar. 3, 2022 in U.S. Appl. No. 17/378,783.
Office Action issued May 25, 2023 in U.S. Appl. No. 17/955,251.
Office Action issued Nov. 21, 2023 in Japanese Application No. 2022-553821.
Office Action issued Nov. 30, 2021 in U.S. Appl. No. 17/329,275.
Office Action issued Nov. 8, 2019 in U.S. Appl. No. 16/367,918.
Office Action issued Oct. 27, 2020 in U.S. Appl. No. 16/368,199.
Office Action issued Oct. 27, 2020 in U.S. Appl. No. 16/777,418.
Office Action issued Sep. 13, 2021 in U.S. Appl. No. 16/825,425.
Office Action issued Sep. 27, 2021 in U.S. Appl. No. 16/874,170.
Written Opinion issued Nov. 30, 2021 in International Application No. PCT/JP2021/034157.
Notice of Allowance issued Jun. 1, 2023 in U.S. Appl. No. 17/953,953.

(56) References Cited

OTHER PUBLICATIONS

Notice of Allowance issued Oct. 24, 2023 in U.S. Appl. No. 17/955,113.
Notice of Allowance issued Oct. 25, 2023 in U.S. Appl. No. 17/954,800.
Notice of Allowance issued Oct. 25, 2023 in U.S. Appl. No. 17/955,808.
Notice of Allowance issued Sep. 13, 2023 in U.S. Appl. No. 17/953,953.
Office Action issued Aug. 19, 2024 in U.S. Appl. No. 18/524,724.
Office Action issued May 25, 2023 in U.S. Appl. No. 17/954,808.
Office Action issued May 25, 2023 in U.S. Appl. No. 17/955,113.
Office Action issued May 25, 2023 in U.S. Appl. No. 17/954,800.
International Search Report issued Feb. 14, 2023 in International Application No. PCT/JP2022/043998, corresponds to U.S. Appl. No. 18/680,257.
Written Opinion issued Feb. 14, 2023 in International Application No. PCT/JP2022/043998, corresponds to U.S. Appl. No. 18/680,257.
International Preliminary Report on Patentability dated May 2, 2024 with a Translation of the Written Opinion of the International Searching Authority in Application No. PCT/JP2022/043998, corresponds to U.S. Appl. No. 18/680,257.

* cited by examiner

SERVO SIGNAL READING ELEMENT 1

MAGNETIC HEAD ELEMENT Ch0

MAGNETIC HEAD ELEMENT Ch1

MAGNETIC HEAD ELEMENT Ch2

MAGNETIC HEAD ELEMENT Ch3

MAGNETIC HEAD ELEMENT Ch29

MAGNETIC HEAD ELEMENT Ch30

MAGNETIC HEAD ELEMENT Ch31

SERVO SIGNAL READING ELEMENT 2

MODULE

L

MAGNETIC TAPE HAVING CHARACTERIZED MAGNETIC LAYER SURFACE, MAGNETIC TAPE CARTRIDGE, AND MAGNETIC TAPE DEVICE

CROSS-REFERENCE TO RELATED APPLICATIONS

This application is a continuation of U.S. application Ser. No. 17/955,156 filed Sep. 28, 2022 which claims priority under 35 U.S.C. 119 to Japanese Patent Application No. 2021-158786 filed on Sep. 29, 2021 and Japanese Patent Application No. 2022-135818 filed on Aug. 29, 2022. Each of the above applications is hereby expressly incorporated by reference, in its entirety, into the present application.

BACKGROUND OF THE INVENTION

1. Field of the Invention

The present invention relates to a magnetic tape, a magnetic tape cartridge, and a magnetic tape device.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up or archives (for example, see JP2016-524774A and US2019/0164573A1).

SUMMARY OF THE INVENTION

Further improvement of electromagnetic conversion characteristics is always required for magnetic recording media. Accordingly, a magnetic tape capable of exhibiting excellent electromagnetic conversion characteristics is desirable.

Meanwhile, the recording of data on a magnetic tape is normally performed by causing the magnetic tape to run in a magnetic tape device and causing a magnetic head to follow a data band of the magnetic tape to record data on the data band. Accordingly, a data track is formed on the data band. In addition, in a case of reproducing the recorded data, the magnetic tape is caused to run in the magnetic tape device and the magnetic head is caused to follow the data band of the magnetic tape, thereby reading data recorded on the data band.

In order to increase an accuracy with which the magnetic head follows the data band of the magnetic tape in the recording and/or the reproducing, a system that performs head tracking using a servo signal (hereinafter, referred to as a "servo system") is practiced.

In addition, it is proposed that dimensional information of a magnetic tape during running in a width direction (contraction, expansion, or the like) is obtained using the servo signal and an angle for tilting an axial direction of a module of a magnetic head with respect to the width direction of the magnetic tape (hereinafter, also referred to as a "head tilt angle") is changed according to the obtained dimensional information (see JP6590102B and US2019/0164573A1, for example, paragraphs 0059 to 0067 and paragraph 0084 of JP6590102B). During the recording or the reproducing, in a case where the magnetic head for recording or reproducing data records or reproduces data while being deviated from a target track position due to width deformation of the magnetic tape, phenomenons such as overwriting on recorded data, reproducing failure, and the like may occur. The present inventors consider that changing the angle as described above is one of a unit for suppressing the occurrence of such a phenomenon. For example, assuming that the head tilt angle is changed as described above, a magnetic tape in which a deterioration in electromagnetic conversion characteristics is small, in a case of recording and/or reproducing data at different head tilt angles is desirable.

One aspect of the present invention is to provide a magnetic tape capable of exhibiting excellent electromagnetic conversion characteristics and having a small deterioration in electromagnetic conversion characteristics in a case of recording and/or reproducing data at different head tilt angles.

An aspect of the invention is as follows.

(1) A magnetic tape comprising:
a non-magnetic support; and
a magnetic layer containing a ferromagnetic powder,
wherein an arithmetic average roughness Ra measured at a surface of the magnetic layer with an atomic force microscope (hereinafter, also referred to as a "magnetic layer surface Ra") is 2.0 nm or less, and
in an environment with a temperature of 23° C. and a relative humidity of 50%,
an AlFeSil abrasion value$_{45°}$ of a surface of the magnetic layer measured at a tilt angle of 45° of an AlFeSil prism is 20 µm to 50 µm,
a standard deviation of an AlFeSil abrasion value of the surface of the magnetic layer measured at each of tilt angles of 0°, 15°, 30°, and 45° of the AlFeSil prism (hereinafter, also simply referred to as a "standard deviation of an AlFeSil abrasion value") is 30 µm or less, and
the tilt angle of the AlFeSil prism is an angle formed by a longitudinal direction of the AlFeSil prism and a width direction of the magnetic tape.

(2) The magnetic tape according to (1),
wherein the standard deviation of the AlFeSil abrasion value is 15 µm to 30 µm.

(3) The magnetic tape according to (1) or (2),
wherein the arithmetic average roughness Ra is 1.0 nm to 2.0 nm.

(4) The magnetic tape according to any one of (1) to (3),
wherein a standard deviation of curvature of the magnetic tape in a longitudinal direction (hereinafter, also simply referred to as a "standard deviation of curvature") is 5 mm/m or less.

(5) The magnetic tape according to any one of (1) to (4),
wherein the magnetic layer contains one or more kinds of non-magnetic powder.

(6) The magnetic tape according to (5),
wherein the non-magnetic powder contains an alumina powder.

(7) The magnetic tape according to any one of (1) to (6),
further comprising:
a non-magnetic layer containing a non-magnetic powder between the non-magnetic support and the magnetic layer.

(8) The magnetic tape according to (7),
wherein a thickness of the non-magnetic layer is 0.1 µm to 0.7 µm.

(9) The magnetic tape according to any one of (1) to (8),
further comprising:
a back coating layer containing a non-magnetic powder on a surface side of the non-magnetic support opposite to a surface side provided with the magnetic layer.

(10) The magnetic tape according to any one of (1) to (9), wherein a tape thickness is 5.2 μm or less.
(11) The magnetic tape according to any one of (1) to (10), wherein a tape thickness is 5.0 μm or less.
(12) The magnetic tape according to any one of (1) to (11), wherein a vertical squareness ratio of the magnetic tape is 0.60 or more.
(13) The magnetic tape according to any one of (1) to (12),
wherein a vertical squareness ratio of the magnetic tape is 0.65 or more.
(14) A magnetic tape cartridge comprising:
the magnetic tape according to any one of (1) to (13).
(15) A magnetic tape device comprising:
the magnetic tape according to any one of (1) to (13).
(16) The magnetic tape device according to (15), further comprising:
a magnetic head,
wherein the magnetic head includes a module including an element array having a plurality of magnetic head elements between a pair of servo signal reading elements, and
the magnetic tape device changes an angle θ formed by an axis of the element array with respect to the width direction of the magnetic tape during running of the magnetic tape in the magnetic tape device.

According to one aspect of the present invention, it is possible to provide a magnetic tape capable of exhibiting excellent electromagnetic conversion characteristics and having a small deterioration in electromagnetic conversion characteristics in a case of recording and/or reproducing data at different head tilt angles. In addition, according to one aspect of the invention, it is possible to provide a magnetic tape cartridge and a magnetic tape device including the magnetic tape.

DESCRIPTION OF THE PREFERRED EMBODIMENTS

Magnetic Tape

Figure 1:
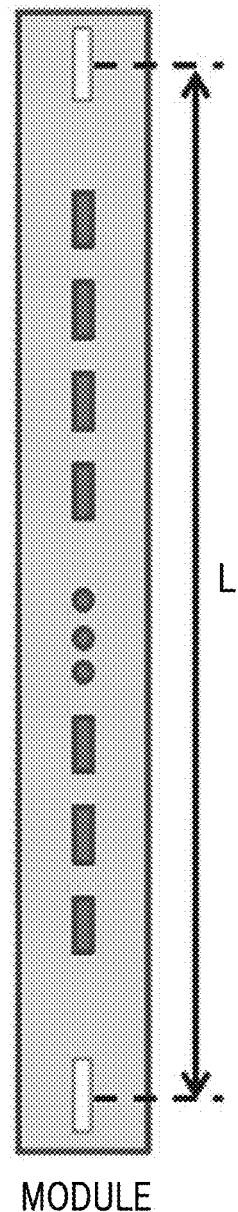
FIG. 1 is a schematic view showing an example of a module of a magnetic head.

An aspect of the invention relates to a magnetic tape including a non-magnetic support, and a magnetic layer containing a ferromagnetic powder. An arithmetic average roughness Ra measured at a surface of the magnetic layer with an atomic force microscope (magnetic layer surface Ra) is 2.0 nm or less. In addition, in an environment with a temperature of 23° and a relative humidity of 50%, an AlFeSil abrasion value$_{45°}$ of a surface of the magnetic layer measured at a tilt angle of 45° of an AlFeSil prism of the magnetic tape is 20 μm to 50 μm and a standard deviation of an AlFeSil abrasion value of the surface of the magnetic layer measured at each of tilt angles of 0°, 15°, 30°, and 45° of the AlFeSil prism is 30 μm or less. In the invention and the specification, the "surface of the magnetic layer" is identical to a surface of the magnetic tape on the magnetic layer side.

Magnetic Layer Surface Ra

In the invention and the specification, the arithmetic average roughness Ra is obtained by measurement using an atomic force microscope (AFM). Specifically, the magnetic layer surface Ra is a value measured with the AFM in a region having an area of 40 μm×40 μm on the surface of the magnetic layer. The measurement is performed at three different measurement points on the surface of the magnetic layer (n=3). The magnetic layer surface Ra is obtained as an arithmetic average of the three arithmetic average roughnesses Ra obtained by such measurement. The following measurement conditions can be used as an example of the measurement conditions. The magnetic layer surface Ra shown in Examples which will be described later is a value obtained by measurement under the following measurement conditions.

The measurement regarding a region of the surface of the magnetic layer of the magnetic tape having an area of 40 μm×40 μm is performed with an AFM (Nanoscope 4 manufactured by Veeco Instruments, Inc.) in a tapping mode. RTESP-300 manufactured by BRUKER was used as a probe, a scan speed (probe movement speed) was set as 40 μm/sec, and a resolution was set as 512 pixel×512 pixel.

The magnetic layer surface Ra of the magnetic tape is 2.0 nm or less, preferably 1.8 nm or less, and more preferably 1.6 nm or less, from a viewpoint of improving the electromagnetic conversion characteristics. The magnetic layer surface Ra of the magnetic tape can be, for example, 0.5 nm or more, 0.7 nm or more, or 1.0 nm or more, or can be less than the value exemplified here. It is preferable that the value of the magnetic layer surface Ra is small, from a viewpoint of further improving the electromagnetic conversion characteristics. The magnetic layer surface Ra can be controlled by a well-known method, for example, can be controlled by adjusting manufacturing conditions (for example, calendar processing conditions) of the magnetic tape.

Description of Head Tilt Angle

Hereinafter, prior to the description of the tilt angle of the AlFeSil prism, a configuration of the magnetic head, a head tilt angle, and the like will be described. In addition, a reason why it is considered that the phenomenon occurring during the recording or during the reproducing described above can be suppressed by tilting an axial direction of the module of the magnetic head with respect to the width direction of the magnetic tape while the magnetic tape is running will also be described later.

The magnetic head may include one or more modules including an element array including a plurality of magnetic head elements between a pair of servo signal reading elements, and can include two or more modules or three or more modules. The total number of such modules can be, for example, 5 or less, 4 or less, or 3 or less, or the magnetic head may include the number of modules exceeding the total number exemplified here. Examples of arrangement of the plurality of modules can include "recording module-reproducing module" (total number of modules: 2), "recording module-reproducing module-recording module" (total number of modules: 3), and the like. However, the invention is not limited to the examples shown here.

Each module can include an element array including a plurality of magnetic head elements between a pair of servo signal reading elements, that is, arrangement of elements. The module including a recording element as the magnetic head element is a recording module for recording data on the magnetic tape. The module including a reproducing element as the magnetic head element is a reproducing module for reproducing data recorded on the magnetic tape. In the magnetic head, the plurality of modules are arranged, for example, in a recording and reproducing head unit so that an axis of the element array of each module is oriented in parallel. The "parallel" does not mean only parallel in the strict sense, but also includes a range of errors normally allowed in the technical field of the invention. For example, the range of errors means a range of less than ±10° from an exact parallel direction.

In each element array, the pair of servo signal reading elements and the plurality of magnetic head elements (that is, recording elements or reproducing elements) are usually arranged to be in a straight line spaced apart from each other. Here, the expression that "arranged in a straight line" means that each magnetic head element is arranged on a straight line connecting a central portion of one servo signal reading element and a central portion of the other servo signal reading element. The "axis of the element array" in the present invention and the present specification means the straight line connecting the central portion of one servo signal reading element and the central portion of the other servo signal reading element.

Next, the configuration of the module and the like will be further described with reference to the drawings. However, the aspect shown in the drawings is an example and the invention is not limited thereto.

FIG. 1 is a schematic view showing an example of a module of a magnetic head. The module shown in FIG. 1 includes a plurality of magnetic head elements between a pair of servo signal reading elements (servo signal reading elements 1 and 2). The magnetic head element is also referred to as a "channel". "Ch" in the drawing is an abbreviation for a channel. The module shown in FIG. 1 includes a total of 32 magnetic head elements of Ch0 to Ch31.

In FIG. 1, "L" is a distance between the pair of servo signal reading elements, that is, a distance between one servo signal reading element and the other servo signal reading element. In the module shown in FIG. 1, the "L" is a distance between the servo signal reading element 1 and the servo signal reading element 2. Specifically, the "L" is a distance between a central portion of the servo signal reading element 1 and a central portion of the servo signal reading element 2. Such a distance can be measured by, for example, an optical microscope or the like.

Figure 2:
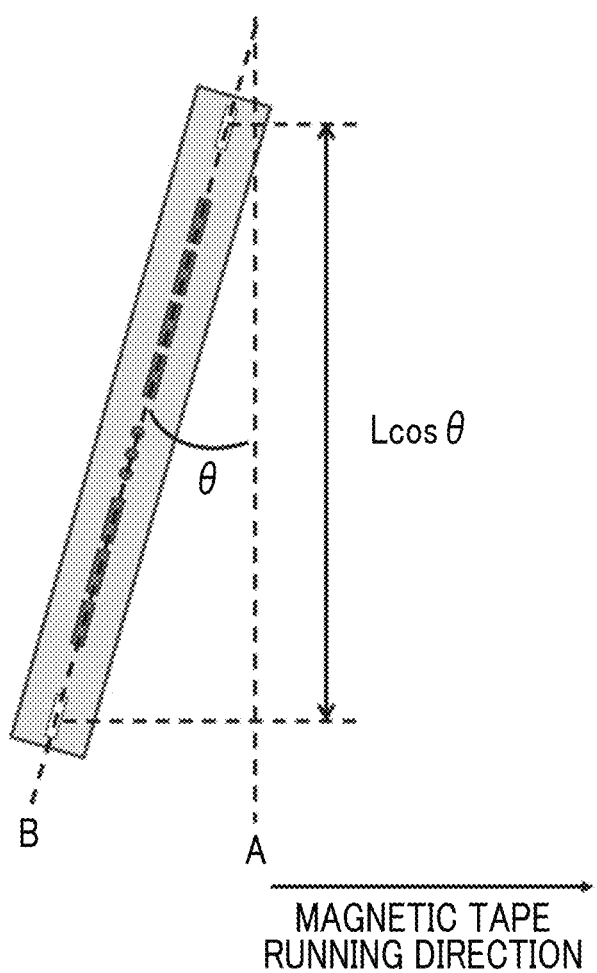
FIG. 2 is an explanatory diagram of a relative positional relationship between a module and a magnetic tape during running of the magnetic tape in a magnetic tape device.

FIG. 2 is an explanatory diagram of a relative positional relationship between the module and the magnetic tape during running of the magnetic tape in the magnetic tape device. In FIG. 2, a dotted line A indicates a width direction of the magnetic tape. A dotted line B indicates an axis of the element array. An angle θ can be the head tilt angle during the running of the magnetic tape, and is an angle formed by the dotted line A and the dotted line B. During the running of the magnetic tape, in a case where the angle θ is 0°, a distance in a width direction of the magnetic tape between one servo signal reading element and the other servo signal reading element of the element array (hereinafter, also referred to as an "effective distance between servo signal reading elements") is "L". On the other hand, in a case where the angle θ exceeds 0°, the effective distance between the servo signal reading elements is "L cos θ" and the L cos θ is smaller than the L. That is, "L cos θ<L".

As described above, during the recording or the reproducing, in a case where the magnetic head for recording or reproducing data records or reproduces data while being deviated from a target track position due to width deformation of the magnetic tape, phenomenons such as overwriting on recorded data, reproducing failure, and the like may occur. For example, in a case where a width of the magnetic tape contracts or extends, a phenomenon may occur in which the magnetic head element that should record or reproduce at a target track position records or reproduces at a different track position. In addition, in a case where the width of the magnetic tape extends, the effective distance between the servo signal reading elements may be shortened than a spacing of two adjacent servo bands with a data band interposed therebetween (also referred to as a "servo band spacing" or "spacing of servo bands", specifically, a distance between the two servo bands in the width direction of the magnetic tape), and a phenomenon in that the data is not recorded or reproduced at a part close to an edge of the magnetic tape can occur.

With respect to this, in a case where the element array is tilted at the angle θ exceeding 0°, the effective distance between the servo signal reading elements becomes "L cos θ" as described above. The larger the value of θ, the smaller the value of L cos θ, and the smaller the value of θ, the larger the value of L cos θ. Accordingly, in a case where the value of θ is changed according to a degree of dimension change (that is, contraction or expansion) in the width direction of the magnetic tape, the effective distance between the servo signal reading elements can be brought closer to or matched with the spacing of the servo bands. Therefore, during the recording or the reproducing, it is possible to prevent the occurrence of phenomenons such as overwriting on recorded data, reproducing failure, and the like caused in a case where the magnetic head for recording or reproducing data records or reproduces data while being deviated from a target track position due to width deformation of the magnetic tape, or it is possible to reduce a frequency of occurrence thereof.

Figure 3:
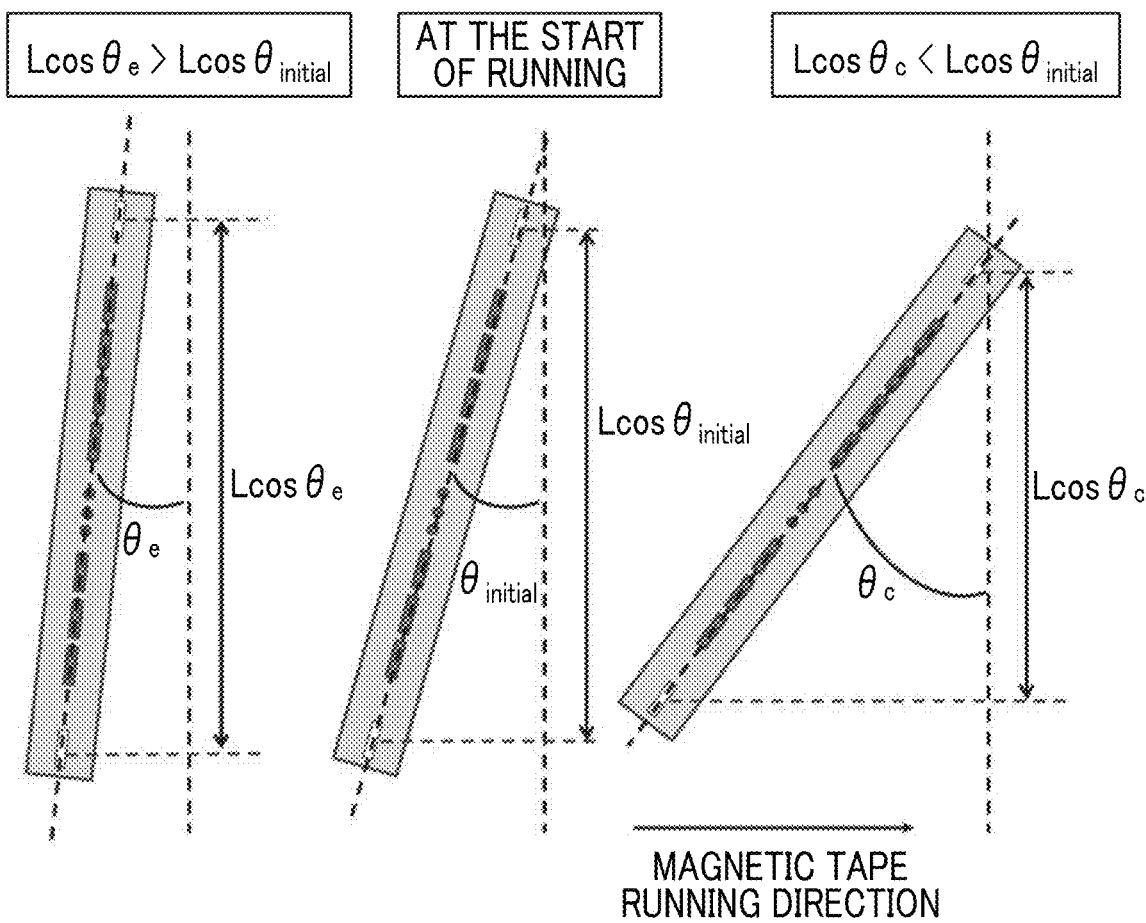
FIG. 3 is an explanatory diagram of a change in angle θ during the running of the magnetic tape.

FIG. 3 is an explanatory diagram of a change in angle θ during the running of the magnetic tape.

The angle θ at the start of running, $\theta_{initial}$, can be set to, for example, 0° or more or more than 0°.

In FIG. 3, a central diagram shows a state of the module at the start of running.

In FIG. 3, a right diagram shows a state of the module in a case where the angle θ is set to an angle $\theta_c$ which is a larger angle than the $\theta_{initial}$. The effective distance between the servo signal reading elements L cos $\theta_c$, is a value smaller than L cos $\theta_{initial}$ at the start of running of the magnetic tape. In a case where the width of the magnetic tape is contracted during the running of the magnetic tape, it is preferable to perform such angle adjustment.

On the other hand, in FIG. 3, a left diagram shows a state of the module in a case where the angle θ is set to an angle $\theta_e$ which is a smaller angle than the $\theta_{initial}$. The effective distance between the servo signal reading elements L cos $\theta_e$ is a value larger than L cos $\theta_{initial}$ at the start of running of the magnetic tape. In a case where the width of the magnetic tape is expanded during the running of the magnetic tape, it is preferable to perform such angle adjustment.

As described above, the change of the head tilt angle during the running of the magnetic tape can contribute to prevention of the occurrence of phenomenons such as overwriting on recorded data, reproducing failure, and the like caused in a case where the magnetic head for recording or reproducing data records or reproduces data while being deviated from a target track position due to width deformation of the magnetic tape, or to reduction of a frequency of occurrence thereof.

Meanwhile, the recording of data on the magnetic tape and the reproducing of the recorded data are performed by bringing the surface of the magnetic layer of the magnetic tape into contact with the magnetic head and sliding. The inventors of the present invention considered that, in a case where the head tilt angle changes during such sliding, a contact state between the magnetic head and the surface of the magnetic layer can change and this can be a reason of a deterioration in electromagnetic conversion characteristics. Specifically, the inventors of the present invention considered that, in a case where the head tilt angle changes, a degree of abrasion of the magnetic head caused by the contact with the surface of the magnetic layer significantly changes, and accordingly, the electromagnetic conversion characteristics deteriorates.

Based on the surmise described above, the present inventors conducted intensive studies. As a result, it is newly found that, regarding the abrasion property of the magnetic tape, by setting the AlFeSil abrasion value$_{45°}$ measured at the tilt angle 45° of the AlFeSil prism and the standard deviation of the AlFeSil abrasion value of the surface of the magnetic layer measured at each of tilt angles of 0°, 15°, 30°, and 45° of the AlFeSil prism, in the environment with the temperature of 23° and a relative humidity of 50%, to the ranges described above, the deterioration in electromagnetic conversion characteristics can be suppressed in a case of performing recording and/or reproducing of data at different head tilt angles. Hereinafter, the deterioration in electromagnetic conversion characteristics in a case of performing recording and/or reproducing of data at different head tilt angles is also simply referred to as a "deterioration in electromagnetic conversion characteristics". The temperature and humidity of the measurement environment are used as exemplary values of the temperature and humidity of the use environment of the magnetic tape. Accordingly, the environment in which the data is recorded on the magnetic tape and the recorded data is reproduced is not limited to the environment with the temperature and the humidity described above. The tilt angle of the AlFeSil prism in a case of measuring the AlFeSil abrasion value is also used as an exemplary value of the angle that can be used in a case of performing the recording and/or reproducing of data by changing the head tilt angle during the running of the magnetic tape. Accordingly, the head tilt angle in a case where the data is recorded on the magnetic tape and the recorded data is reproduced is not limited to the angle described above. In addition, the present invention is not limited to the inference of the inventors described in the present specification.

AlFeSil Abrasion Value$_{45°}$ and Standard Deviation of AlFeSil Abrasion Value

Measuring Method

In the present invention and the present specification, the AlFeSil abrasion value at tilt angles of 0°, 15°, 30°, and 45° of the AlFeSil prism is a value measured by the following method in the environment with a temperature of 23° C. and a relative humidity of 50%.

An abrasion width of the AlFeSil prism, in a case where the magnetic tape to be measured is caused to run under the following running conditions using a reel tester, is measured. The AlFeSil prism is a prism made of AlFeSil, which is a sendust-based alloy. For the evaluation, the AlFeSil prism specified in European Computer Manufacturers Association (ECMA)-288/Annex H/H2 is used. For the abrasion width of the AlFeSil prism, an edge of the AlFeSil prism is observed from the above using an optical microscope and an abrasion width described based on FIG. 1 of JP2007-026564A is obtained in a paragraph 0015 of JP2007-026564A.

The tilt angle of the AlFeSil prism (hereinafter, also simply referred to as a "tilt angle") is an angle formed by the longitudinal direction of the AlFeSil prism and the width direction of the magnetic tape, and is defined in a range of 0° to 90°. In a case where the longitudinal direction of the AlFeSil prism and the width direction of the magnetic tape match, it is set to the tilt angle 0° of the AlFeSil prism, and in a case where the longitudinal direction of the AlFeSil prism and the longitudinal direction of the magnetic tape, it is set to the tilt angle 90° of the AlFeSil prism.

Running Conditions

At tilt angles of 0°, 15°, 30°, or 45° of the AlFeSil prism, the surface of the magnetic layer of the magnetic tape is brought into contact with one ridge side of the AlFeSil prism at a lap angle of 12°. In this state, a portion of the magnetic tape to be measured over a length of 580 m in the longitudinal direction is caused to run at a speed of 3 m/sec and reciprocated once.

In the measurement of the AlFeSil abrasion value at each tilt angle, a tension applied in the longitudinal direction of the magnetic tape during the running is set to 1.0 N. Here, a value of the tension applied in the longitudinal direction of the magnetic tape during the running is a set value of a reel tester. The AlFeSil abrasion width measured after one round trip is defined as the AlFeSil abrasion value at each tilt angle. One unused AlFeSil prism that is not used in the measurement of the AlFeSil abrasion value is prepared. The measurement of the AlFeSil abrasion value at the above four different tilt angles is performed in an arbitrary order by bringing the surface of the magnetic layer into contact with one ridge side of the four ridge sides of the AlFeSil abrasion value. The measurement of the AlFeSil abrasion value at each tilt angle is performed on different portions of the magnetic tape to be measured. In addition, before the measurement at each tilt angle, the magnetic tape to be measured is left in a measurement environment for 24 hours or longer in order to be familiar with the measurement environment.

Among the AlFeSil abrasion values obtained by the above method, the AlFeSil abrasion value obtained by the measurement at the tilt angle of 45° is the AlFeSil abrasion value$_{45°}$. The standard deviation of the AlFeSil abrasion value obtained at the four different tilt angles (that is, a positive square root of the dispersion) is set to the standard deviation of the AlFeSil abrasion value of the magnetic tape to be measured.

AlFeSil Abrasion Value$_{45°}$.

Regarding the abrasion property of the magnetic tape, the AlFeSil abrasion value$_{45°}$ is 20 µm to 50 µm, from a viewpoint of suppressing a deterioration in electromagnetic conversion characteristics in a case of performing the recording and/or reproducing of data at different head tilt angles. From a viewpoint of further suppressing the deterioration in the electromagnetic conversion characteristics, the AlFeSil abrasion value$_{45°}$ is preferably 45 µm or less, more preferably 40 µm or less, and even more preferably 35 µm or less. From the same viewpoint, the AlFeSil abrasion value$_{45°}$ is preferably 23 µm or more, and more preferably 25 µm or more.

Standard Deviation of AlFeSil Abrasion Value

The standard deviation of the AlFeSil abrasion value of the magnetic tape is 30 µm or less, preferably 28 µm or less, more preferably 25 µm or less, even more preferably 23 µm or less, and still preferably 20 µm or less, from a viewpoint of suppressing a deterioration in electromagnetic conversion characteristics in a case of performing the recording and/or reproducing of data at different head tilt angles. The standard deviation of the AlFeSil abrasion value can be, for example, 0 µm or more, more than 0 µm, 1 µm or more, 3 µm or more, 5 µm or more, 7 µm or more, 10 µm or more, 12 µm or more, or 15 µm or more. It is preferable that the value of the standard deviation of the AlFeSil abrasion value is small, from a viewpoint of further suppressing the deterioration in electromagnetic conversion characteristics.

The abrasion property of the magnetic tape can be adjusted, for example, according to a kind of component used for manufacturing the magnetic layer. The details of this point will be described later.

Standard Deviation of Curvature

Next, a standard deviation of a curvature will be described.

The curvature of the magnetic tape in the longitudinal direction of the present invention and the present specification is a value obtained by the following method in an environment of an atmosphere temperature of 23° C. and a relative humidity of 50%. The magnetic tape is normally accommodated and circulated in a magnetic tape cartridge. As the magnetic tape to be measured, a magnetic tape taken out from an unused magnetic tape cartridge that is not attached to the magnetic tape device is used.

Figure 4:
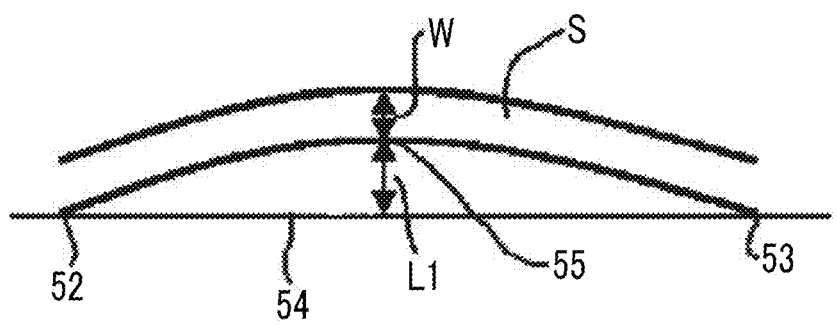
FIG. 4 is an explanatory diagram of a curvature of a magnetic tape in a longitudinal direction.

FIG. 4 is an explanatory diagram of the curvature of the magnetic tape in the longitudinal direction.

A tape sample having a length of 100 m in the longitudinal direction is cut out from a randomly selected portion of the magnetic tape to be measured. One end of this tape sample is defined as a position of 0 m, and a position spaced apart from this one end toward the other end by D m (D meters) in the longitudinal direction is defined as a position of D m. Accordingly, a position spaced apart by 10 m in the longitudinal direction is defined as a position of 10 m, a position spaced apart by 20 m is defined as a position of 20 m, and in this manner, a position of 30 m, a position of 40 m, a position of 50 m, a position of 60 m, a position of 70 m, a position of 80 m, a position of 90 m, and a position of 100 m are defined at intervals of 10 m sequentially.

A tape sample having a length of 1 m from the 0 m position to the position of 1 m is cut out. This tape sample is used as a tape sample for measuring the curvature at the position of 0 m.

A tape sample having a length of 1 m from the 10 m position to the position of 11 m is cut out. This tape sample is used as a tape sample for measuring the curvature at the position of 10 m.

A tape sample having a length of 1 m from the 20 m position to the position of 21 m is cut out. This tape sample is used as a tape sample for measuring the curvature at the position of 20 m.

A tape sample having a length of 1 m from the 30 m position to the position of 31 m is cut out. This tape sample is used as a tape sample for measuring the curvature at the position of 30 m.

A tape sample having a length of 1 m from the 40 m position to the position of 41 m is cut out. This tape sample is used as a tape sample for measuring the curvature at the position of 40 m.

A tape sample having a length of 1 m from the 50 m position to the position of 51 m is cut out. This tape sample is used as a tape sample for measuring the curvature at the position of 50 m.

A tape sample having a length of 1 m from the 60 m position to the position of 61 m is cut out. This tape sample is used as a tape sample for measuring the curvature at the position of 60 m.

A tape sample having a length of 1 m from the 70 m position to the position of 71 m is cut out. This tape sample is used as a tape sample for measuring the curvature at the position of 70 m.

A tape sample having a length of 1 m from the 80 m position to the position of 81 m is cut out. This tape sample is used as a tape sample for measuring the curvature at the position of 80 m.

A tape sample having a length of 1 m from the 90 m position to the position of 91 m is cut out. This tape sample is used as a tape sample for measuring the curvature at the position of 90 m.

A tape sample having a length of 1 m from the 99 m position to the position of 100 m is cut out. This tape sample is used as a tape sample for measuring the curvature at the position of 100 m.

The tape sample of each position is hung for 24 hours±4 hours in a tension-free state by gripping an upper end portion with a gripping member (clip or the like) by setting the longitudinal direction as the vertical direction. Then, within 1 hour, the following measurement is performed.

As shown in FIG. 4, the tape piece is placed on a flat surface in a tension-free state. The tape piece may be placed on a flat surface with the surface on the magnetic layer side facing upward, or may be placed on a flat surface with the other surface facing upward. In FIG. 4, S indicates a tape sample and W indicates the width direction of the tape sample. Using an optical microscope, a distance L1 (unit: mm) that is a shortest distance between a virtual line 54 connecting both terminal portions 52 and 53 of the tape sample S and a maximum curved portion 55 in the longitudinal direction of the tape sample S is measured. FIG. 4 shows an example in which the tape sample is curved upward on a paper surface. Even in a case where the tape sample is curved downward, the distance L1 (mm) is measured in the same manner. The distance L1 is displayed as a positive value regardless of which side is curved. In a case where no curve in the longitudinal direction is confirmed, the L1 is set to 0 (zero) mm.

By doing so, a standard deviation of the curvature L1 measured for a total of 11 positions from the position of 0 m to the position of 100 m (that is, a positive square root of the dispersion) is the standard deviation of the curvature of the magnetic tape to be measured in the longitudinal direction (unit: mm/m).

In the magnetic tape, the standard deviation of the curvature obtained by the method described above can be, for example, 7 mm/m or less and 6 mm/m or less, and from a viewpoint of further suppressing a deterioration in electromagnetic conversion characteristics, it is preferably 5 mm/m or less, more preferably 4 mm/m or less, and even more preferably 3 mm/m or less. The standard deviation of the curvature of the magnetic tape can be, for example, 0 mm/m or more, more than 0 mm/m, 1 mm/m or more, or 2 mm/m or more. It is preferable that the value of the standard deviation of the curvature is small, from a viewpoint of further suppressing the deterioration in electromagnetic conversion characteristics. In addition, it is preferable that the value of the standard deviation of the curvature is small, from a viewpoint of further improving the electromagnetic conversion characteristics. From such a viewpoint, it is preferable that the standard deviation of the curvature is in the range described above.

The standard deviation of the curvature can be controlled by adjusting the manufacturing conditions of the manufacturing step of the magnetic tape. This point will be described later in detail.

Hereinafter, the magnetic tape will be described more specifically.

Magnetic Layer

Ferromagnetic Powder

As the ferromagnetic powder contained in the magnetic layer, a well-known ferromagnetic powder can be used as one kind or in combination of two or more kinds as the ferromagnetic powder used in the magnetic layer of various magnetic recording media. It is preferable to use a ferromagnetic powder having an average particle size as the ferromagnetic powder, from a viewpoint of improvement of a recording density. From this viewpoint, an average particle size of the ferromagnetic powder is preferably equal to or smaller than 50 nm, more preferably equal to or smaller than 45 nm, even more preferably equal to or smaller than 40 nm, further preferably equal to or smaller than 35 nm, further more preferably equal to or smaller than 30 nm, further even more preferably equal to or smaller than 25 nm, and still preferably equal to or smaller than 20 nm. Meanwhile, from a viewpoint of stability of magnetization, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm.

Hexagonal Ferrite Powder

As a preferred specific example of the ferromagnetic powder, a hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described more specifically.

An activation volume of the hexagonal strontium ferrite powder is preferably in a range of 800 to 1,600 nm$^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 nm$^3$, and can also be, for example, equal to or greater than 850 nm$^3$. In addition, from a viewpoint of further improving the electromagnetic conversion characteristics, the activation volume of the hexagonal strontium ferrite powder is more preferably equal to or smaller than 1,500 nm$^3$, even more preferably equal to or smaller than 1,400 nm$^3$, still preferably equal to or smaller than 1,300 nm$^3$, still more preferably equal to or smaller than 1,200 nm$^3$, and still even more preferably equal to or smaller than 1,100 nm$^3$. The same applies to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one embodiment, the hexagonal strontium ferrite powder including the rare earth atom can have a rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0.

The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder towards the inside from the surface.

In a case where the hexagonal strontium ferrite powder includes the rare earth atom, a content (bulk content) of the rare earth atom is preferably in a range of 0.5 to 5.0 atom % with respect to 100 atom % of the iron atom. It is thought that the rare earth atom having the bulk content in the range described above and uneven distribution of the rare earth atom in the surface layer portion of the particles configuring the hexagonal strontium ferrite powder contribute to the prevention of a decrease in reproducing output during the repeated reproducing. It is surmised that this is because the rare earth atom having the bulk content in the range described above included in the hexagonal strontium ferrite powder and the uneven distribution of the rare earth atom in the surface layer portion of the particles configuring the hexagonal strontium ferrite powder can increase the anisotropy constant Ku. As the value of the anisotropy constant Ku is high, occurrence of a phenomenon called thermal fluctuation (that is, improvement of thermal stability) can be prevented. By preventing the occurrence of the thermal fluctuation, a decrease in reproducing output during the repeated reproducing can be prevented. It is surmised that the uneven distribution of the rare earth atom in the surface layer portion of the particles of the hexagonal strontium ferrite powder contributes to stabilization of a spin at an iron (Fe) site in a crystal lattice of the surface layer portion, thereby increasing the anisotropy constant Ku.

In addition, it is surmised that the use of the hexagonal strontium ferrite powder having the rare earth atom surface layer portion uneven distribution as the ferromagnetic powder of the magnetic layer also contributes to the prevention of chipping of the surface of the magnetic layer due to the sliding with the magnetic head. That is, it is surmised that, the hexagonal strontium ferrite powder having the rare earth atom surface layer portion uneven distribution can also contribute to the improvement of running durability of the magnetic tape. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of preventing reduction of the reproduction output in the repeated reproduction and/or a viewpoint of further improving running durability, the content of rare earth atom (bulk content) is more preferably in a range of 0.5 to 4.5 atom %, even more preferably in a range of 1.0 to 4.5 atom %, and still preferably in a range of 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atoms are included, the bulk content is obtained from the total of the two or more kinds of rare earth atoms. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atoms are unevenly distributed in the surface layer portion (that is, a larger amount of the rare earth atoms is present, compared to that inside), in the particles configuring the hexagonal strontium ferrite powder.

A ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by, for example, a method disclosed in a paragraph 0032 of JP2015-91747A.

The partial dissolving means dissolving performed so that the hexagonal strontium ferrite powder remaining in the solution can be visually confirmed in a case of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed in a case of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the surface layer portion content of the rare earth atom with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 mL of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic tape, it is desirable that the mass magnetization σs of ferromagnetic powder included in the magnetic tape is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that, hexagonal strontium ferrite powder having the rare earth atom surface layer portion uneven distribution is also preferable for preventing such a significant decrease in σs. In one aspect, σs of the hexagonal strontium ferrite powder can be equal to or greater than 45 A×m$^2$/kg and can also be equal to or greater than 47 A×m$^2$/kg. On the other hand, from a viewpoint of noise reduction, σs is preferably equal to or smaller than 80 A×m$^2$/kg and more preferably equal to or smaller than 60 A×m$^2$/kg. σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 [kOe]=(10$^6$/4π) [A/m]

Regarding the content (bulk content) of the constituting atom in the hexagonal strontium ferrite powder, a content of the strontium atom can be, for example, in a range of 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, the hexagonal strontium ferrite powder can include a barium atom and/or a calcium atom. In a case where the other divalent metal atom other than the strontium atom is included, a content of a barium atom and a content of a calcium atom in the hexagonal strontium ferrite powder respectively can be, for example, in a range of 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of AFe$_{12}$O$_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can also include a rare earth atom. In addition, the hexagonal strontium ferrite powder may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of preventing the reduction of the reproduction output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably in a range of 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, a ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a manufacturing method of the ε-iron oxide powder, a manufacturing method from a goethite, a reverse micelle method, and the like are known. All of the manufacturing methods are well known. For the method of manufacturing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. S280-S284, J. Mater. Chem. C, 2013, 1, pp. 5200-5206 can be referred, for example. However, the manufacturing method of the ε-iron oxide powder capable of being used as the ferromagnetic powder in the magnetic layer of the magnetic tape is not limited to the method described here.

An activation volume of the ε-iron oxide powder is preferably in a range of 300 to 1,500 nm$^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 nm$^3$, and can also be, for example, equal to or greater than 500 nm$^3$. In addition, from a viewpoint of further improving the electromagnetic conversion characteristics, the activation volume of the ε-iron oxide powder is more preferably equal to or smaller than 1,400 nm$^3$, even more preferably equal to or smaller than 1,300 nm$^3$, still preferably equal to or smaller than 1,200 nm$^3$, and still more preferably equal to or smaller than 1,100 nm$^3$.

The anisotropy constant Ku can be used as an index of reduction of thermal fluctuation, that is, improvement of thermal stability. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproducing output in a case of reproducing data recorded on a magnetic tape, it is desirable that the mass magnetization σs of ferromagnetic powder included in the magnetic tape is high. In regard to this point, in one aspect, σs of the ε-iron oxide powder can be equal to or greater than 8 A×m$^2$/kg and can also be equal to or greater than 12 A×m$^2$/kg. On the other hand, from a viewpoint of noise reduction, σs of the ε-iron oxide powder is preferably equal to or smaller than 40 A×m$^2$/kg and more preferably equal to or smaller than 35 A×m$^2$/kg.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetic average of the particle size of 500 particles obtained as described above is the average particle size of the powder. As the transmission electron microscope, a transmission electron microscope H-9000 manufactured by Hitachi, Ltd. can be used, for example. In addition, the measurement of the particle size can be performed by a well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term, particles may be used for representing the powder.

As a method for collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a major axis configuring the particle, that is, a major axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the major axis configuring the particles cannot be specified from the shape, the particle size is shown as an equivalent circle diameter. The equivalent circle diameter is a value obtained by a circle projection method.

In addition, regarding an average acicular ratio of the powder, a length of a minor axis, that is, a minor axis length of the particles is measured in the measurement described above, a value of (major axis length/minor axis length) of each particle is obtained, and an arithmetic average of the values obtained regarding 500 particles is calculated. Here, unless otherwise noted, in a case of (1), the minor axis length as the definition of the particle size is a length of a minor axis configuring the particle, in a case of (2), the minor axis length is a thickness or a height, and in a case of (3), the major axis and the minor axis are not distinguished, thus, the value of (major axis length/minor axis length) is assumed as 1, for convenience.

In addition, unless otherwise noted, in a case where the shape of the particle is specified, for example, in a case of definition of the particle size (1), the average particle size is an average major axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50% to 90% by mass and more preferably in a range of 60% to 90% by mass with respect to a total mass of the magnetic layer. A high filling percentage of the ferromagnetic powder in the magnetic layer is preferable from a viewpoint of improvement of recording density.

Binding Agent

The magnetic tape may be a coating type magnetic tape, and can include a binding agent in the magnetic layer. The binding agent is one or more kinds of resin. As the binding agent, various resins normally used as a binding agent of a coating type magnetic recording medium can be used. As the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later. For the binding agent described above, descriptions disclosed in paragraphs 0028 to 0031 of JP2010-24113A can be referred to. In addition, the binding agent may be a radiation curable resin such as an electron beam curable resin. For the radiation curable resin, paragraphs 0044 and 0045 of JP2011-048878A can be referred to.

An average molecular weight of the resin used as the binding agent can be, for example, 10,000 to 200,000 as a weight-average molecular weight. The amount of the binding agent used can be, for example, 1.0 to 30.0 parts by mass with respect to 100.0 parts by mass of the ferromagnetic powder.

Curing Agent

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the manufacturing step of the magnetic tape. The preferred curing agent is a thermosetting compound, and polyisocyanate is suitable. For the details of polyisocyanate, descriptions disclosed in paragraphs 0124 and 0125 of JP2011-216149A can be referred to. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of each layer such as the magnetic layer.

Additives

The magnetic layer may include one or more kinds of additives, as necessary. As the additives, the curing agent described above is used as an example. In addition, examples of the additive included in the magnetic layer include a non-magnetic powder, a lubricant, a dispersing agent, a dispersing assistant, a fungicide, an antistatic agent, and an antioxidant.

As the dispersing agent which can be added to the magnetic layer forming composition, a well-known dispersing agent for increasing dispersibility of a ferromagnetic powder in a carboxy group-containing compound, a nitrogen-containing compound, or the like can also be used. For example, the nitrogen-containing compound may be any of primary amine represented by $NH_2R$, secondary amine represented by $NHR_2$, and tertiary amine represented by $NR_3$. As described above, R indicates any structure configuring the nitrogen-containing compound and a plurality of R may be the same as each other or different from each other.

The nitrogen-containing compound may be a compound (polymer) having a plurality of repeating structures in a molecule. It is thought that a nitrogen-containing portion of the nitrogen-containing compound functioning as an adsorption portion to the surface of the particles of the ferromagnetic powder is a reason for the nitrogen-containing compound to function as the dispersing agent. As the carboxy group-containing compound, for example, fatty acid of oleic acid can be used. Regarding the carboxy group-containing compound, it is thought that a carboxy group functioning as an adsorption portion to the surface of the particles of the ferromagnetic powder is a reason for the carboxy group-containing compound to function as the dispersing agent. It is also preferable to use the carboxy group-containing compound and the nitrogen-containing compound in combination. The amount of these dispersing agent used can be suitably set.

The dispersing agent may be added to a non-magnetic layer forming composition. For the dispersing agent which can be added to the non-magnetic layer forming composition, a description disclosed in paragraph 0061 of JP2012-133837A can be referred to.

As the additive that can added to the magnetic layer, for example, a polyalkyleneimine-based polymer described in JP2016-51493A can also be used. For such a polyalkyleneimine-based polymer, paragraphs 0035 to 0077 of JP2016-51493A and examples of JP2016-51493A can be referred to.

As the non-magnetic powder which may be contained in the magnetic layer, non-magnetic powder which can function as an abrasive, non-magnetic powder which can function as a projection formation agent which forms projections suitably protruded from the surface of the magnetic layer, and the like can be used.

The abrasive is preferably a non-magnetic powder having Mohs hardness exceeding 8 and more preferably a non-magnetic powder having Mohs hardness equal to or greater than 9. A maximum value of Mohs hardness is 10. The abrasive can be a powder of an inorganic substance and can also be a powder of an organic substance. The abrasive can be a powder of an inorganic or organic oxide or a powder of a carbide. Examples of the carbide include a boron carbide (for example, $B_4C$), a titanium carbide (for example, TiC), and the like. In addition, diamond can also be used as the abrasive. In one embodiment, the abrasive is preferably a powder of an inorganic oxide. Specifically, examples of the inorganic oxide include alumina (for example, $Al_2O_3$), a titanium oxide (for example, $TiO_2$), a cerium oxide (for example, $CeO_2$), a zirconium oxide (for example, $ZrO_2$), and the like, and alumina is preferable among these. The Mohs hardness of alumina is approximately 9. For details of the alumina powder, description disclosed in paragraph 0021 of JP2013-229090A can also be referred to. In addition, a specific surface area can be used as an index of a particle size of the abrasive. It is thought that, as the specific surface area is large, the particle size of primary particles of the particles configuring the abrasive is small. As the abrasive, it is preferable to use an abrasive having a specific surface area measured by a Brunauer-Emmett-Teller (BET) method (hereinafter referred to as a "BET specific surface area") equal to or greater than 14 $m^2/g$. In addition, from a viewpoint of dispersibility, it is preferable to use an abrasive having a BET specific surface area equal to or less than 40 $m^2/g$. A content of the abrasive in the magnetic layer is preferably 1.0 to 20.0 parts by mass and more preferably 1.0 to 15.0 parts by mass with respect to 100.0 parts by mass of the ferromagnetic powder. As the abrasive, only one kind of non-magnetic powder can be used or two or more kinds of non-magnetic powders having different compositions and/or physical properties (for example, size) can also be used. In a case of using two or more kinds of non-magnetic powders as the abrasive, the content of the abrasive is a total content of the two or more kinds of non-magnetic powders. The same also applies to contents of various components of the invention and the specification. The abrasive is preferably subjected to a dispersion process (separate dispersion) separately from the ferromagnetic powder, and more preferably subjected to a dispersion process (separate dispersion) separately from the projection formation agent which will be described later. In a case of preparing the magnetic layer forming composition, the usage of two or more kinds of dispersion liquids having different components and/or dispersion conditions as a dispersion liquid of the abrasive (hereinafter, also referred to as an "abrasive solution") is preferable for controlling the abrasion property of the magnetic tape.

A dispersing agent can also be used to adjust a dispersion state of the dispersion liquid of the abrasive. As a compound that can function as a dispersing agent for increasing the dispersibility of the abrasive, an aromatic hydrocarbon compound having a phenolic hydroxy group can be used. The "phenolic hydroxy group" refers to a hydroxy group directly bonded to an aromatic ring. The aromatic ring contained in the aromatic hydrocarbon compound may be a monocyclic ring, a polycyclic structure, or a fused ring. From a viewpoint of improving the dispersibility of the abrasive, an aromatic hydrocarbon compound containing a benzene ring or a naphthalene ring is preferable. In addition, the aromatic hydrocarbon compound may have a substituent other than the phenolic hydroxy group. Examples of the substituent other than the phenolic hydroxy group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxy groups contained in one molecule of the aromatic hydrocarbon compound may be one, two, three, or more.

As one preferable aspect of the aromatic hydrocarbon compound having a phenolic hydroxy group, a compound represented by Formula 100 can be used.

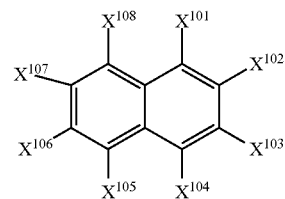

Formula 100

[In Formula 100, two of $X^{101}$ to $X^{108}$ are hydroxy groups, and the other six components each independently represent a hydrogen atom or a substituent.]

In the compound represented by Formula 100, the substitution positions of two hydroxy groups (phenolic hydroxy groups) are not particularly limited.

In Formula 100, two of $X^{101}$ to $X^{108}$ are hydroxy groups (phenolic hydroxy groups), and the other six components are each independently represent a hydrogen atom or a substituent. In addition, among $X^{101}$ to $X^{108}$, all of the moieties other than the two hydroxy groups may be hydrogen atoms, or some or all of them may be substituents. Examples of the substituent include the substituents described above. As a substituent other than the two hydroxy groups, one or more phenolic hydroxy groups may be included. From a viewpoint of improving the dispersibility of the abrasive, it is preferable that the components other than the two hydroxy groups of $X^{101}$ to $X^{108}$ are not phenolic hydroxy groups. That is, the compound represented by Formula 100 is preferably dihydroxynaphthalene or a derivative thereof, and more preferably 2,3-dihydroxynaphthalene or a derivative thereof. Examples of preferred substituents represented by $X^{101}$ to $X^{108}$ include a halogen atom (for example, a chlorine atom or a bromine atom), an amino group, an alkyl group having 1 to 6 (preferably 1 to 4) carbon atoms, and a methoxy group, and an ethoxy group, an acyl group, a nitro group, a nitroso group, and —CH$_2$OH group.

In addition, for the dispersing agent for improving the dispersibility of the abrasive, description disclosed in paragraphs 0024 to 0028 of JP2014-179149A can also be referred to.

The dispersing agent for increasing the dispersibility of the abrasive can be used, for example, in a case of preparing the abrasive solution (for each abrasive solution in a case of preparing a plurality of abrasive solutions), in a proportion of 0.5 to 20.0 parts by mass and is preferably used in a proportion of 1.0 to 10.0 parts by mass with respect to 100.0 parts by mass of the abrasive.

As one aspect of the projection formation agent, carbon black can be used. An average particle size of the carbon black is preferably in a range of 5 to 200 nm and more preferably in a range of 10 to 150 nm. In addition, a BET specific surface area of carbon black is preferably equal to or greater than 10 m$^2$/g and more preferably equal to or greater than 15 m$^2$/g. The BET specific surface area of carbon black is preferably equal to or less than 50 m$^2$/g and more preferably equal to or less than 40 m$^2$/g, from a viewpoint of ease of improving dispersibility. As the other aspect of the projection formation agent, colloidal particles can be used. As the colloidal particles, inorganic colloidal particles are preferable, inorganic oxide colloidal particles are more preferable, and silica colloid particles (colloidal silica) are even more preferred, from a viewpoint of availability. In the present invention and the present specification, the "colloidal particles" are particles which are not precipitated but dispersed to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at any mixing ratio. An average particle size of the colloidal particles can be, for example, 30 to 300 nm and is preferably 40 to 200 nm. A content of the projection formation agent in the magnetic layer is preferably 0.5 to 4.0 parts by mass and more preferably 0.5 to 3.5 parts by mass with respect to 100.0 parts by mass of the ferromagnetic powder. The projection formation agent can be subjected to a dispersion process separately from the ferromagnetic powder, and can also be subjected to a dispersion process separately from the abrasive. In a case of preparing the magnetic layer forming composition, two or more kinds of dispersion liquids having different components and/or dispersion conditions can also be prepared as a dispersion liquid of the projection formation agent (hereinafter, also referred to as an "projection formation agent liquid").

In addition, as an aspect of an additive that can be contained in the magnetic layer, a compound having an ammonium salt structure of an alkyl ester anion represented by Formula 1 can be used.

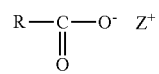

Formula 1

(In Formula 1, R represents an alkyl group having 7 or more carbon atoms or a fluorinated alkyl group having 7 or more carbon atoms, and $Z^+$ represents an ammonium cation.)

The present inventors consider that the compound described above can function as a lubricant. This will be described in detail below.

The lubricant can be broadly divided into a fluid lubricant and a boundary lubricant. The inventors consider that a compound having an ammonium salt structure of an alkyl ester anion represented by Formula 1 can function as a fluid lubricant. It is considered that the fluid lubricant can play a role of imparting lubricity to the magnetic layer by forming a liquid film on the surface of the magnetic layer by itself. It is surmised that, in order to control the AlFeSil abrasion value$_{45°}$ and the standard deviation of the AlFeSil abrasion value, it is desirable that the fluid lubricant forms a liquid film on the surface of the magnetic layer. In addition, the more stably the surface of the magnetic layer and the AlFeSil prism can slide in a case of measuring the AlFeSil abrasion value, the smaller the measured value can be. Regarding the liquid film of the fluid lubricant, from a viewpoint of enabling more stable sliding, it is considered that it is desirable to use an appropriate amount of the fluid lubricant which forms the liquid film on the surface of the magnetic layer. This is because it is surmised that, in a case where the amount of the liquid lubricant which forms the liquid film on the surface of the magnetic layer is excessive, the surface of the magnetic layer and the AlFeSil prism stick to each other, and the sliding stability tends to decrease. In addition, it is surmised that, in a case where the amount of the liquid lubricant which forms the liquid film on the surface of the magnetic layer is excessive, the projection formed on the surface of the magnetic layer by, for example, the projection formation agent is covered with the liquid film. It is considered that this can also be a factor that decreases the sliding stability.

With respect to the point described above, the compound described above has an ammonium salt structure of an alkyl ester anion represented by Formula 1. It is considered that the compound having such a structure can play an excellent role as the fluid lubricant even in a relatively small amount. Therefore, it is considered that including the compound described above in the magnetic layer leads to improving the sliding stability between the surface of the magnetic layer of the magnetic tape and the AlFeSil prism, and contributes to controlling the AlFeSil abrasion value$_{45°}$ and standard deviation of the AlFeSil abrasion value.

Hereinafter, the compound will be further described in detail.

In the invention and the specification, unless otherwise noted, groups described may have a substituent or may be unsubstituted. In addition, the "number of carbon atoms" of a group having a substituent means the number of carbon atoms not including the number of carbon atoms of the substituent, unless otherwise noted. In the present invention and the specification, examples of the substituent include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, a bromine atom, or the like), a cyano group, an amino group, a nitro group, an acyl group, a carboxy group, salt of a carboxy group, a sulfonic acid group, and salt of a sulfonic acid group.

Regarding the compound having an ammonium salt structure of the alkyl ester anion represented by the formula 1, at least a part thereof included in the magnetic layer can form a liquid film on the surface of the magnetic layer, and another part thereof can be included in the magnetic layer, move to the surface of the magnetic layer and form the liquid film during the sliding with the magnetic head. In addition, still another part thereof can be included in the non-magnetic layer which will be described later, and can move to the magnetic layer, further move to the surface of the magnetic layer, and form a liquid film. The "alkyl ester anion" can also be referred to as an "alkyl carboxylate anion".

In Formula 1, R represents an alkyl group having 7 or more carbon atoms or a fluorinated alkyl group having 7 or more carbon atoms. The fluorinated alkyl group has a structure in which some or all of the hydrogen atoms constituting the alkyl group are substituted with a fluorine atom. The alkyl group or fluorinated alkyl group represented by R may have a linear structure, a branched structure, may be a cyclic alkyl group or fluorinated alkyl group, and preferably has a linear structure. The alkyl group or fluorinated alkyl group represented by R may have a substituent, may be unsubstituted, and is preferably unsubstituted. The alkyl group represented by R can be represented by, for example, $C_nH_{2n+1}$—. Here, n represents an integer of 7 or more. In addition, for example, the fluorinated alkyl group represented by R may have a structure in which a part or all of the hydrogen atoms constituting the alkyl group represented by $C_nH_{2n+1}$— are substituted with a fluorine atom. The alkyl group or fluorinated alkyl group represented by R has 7 or more carbon atoms, preferably 8 or more carbon atoms, more preferably 9 or more carbon atoms, further preferably 10 or more carbon atoms, still preferably 11 or more carbon atoms, still more preferably 12 or more carbon atoms, and still even more preferably 13 or more carbon atoms. The alkyl group or fluorinated alkyl group represented by R has preferably 20 or less carbon atoms, more preferably 19 or less carbon atoms, and even more preferably 18 or less carbon atoms.

In Formula 1, $Z^+$ represents an ammonium cation. Specifically, the ammonium cation has the following structure. In the present invention and the present specification, "*" in the formulas that represent a part of the compound represents a bonding position between the structure of the part and the adjacent atom.

The nitrogen cation $N^+$ of the ammonium cation and the oxygen anion $O^-$ in Formula 1 may form a salt bridging group to form the ammonium salt structure of the alkyl ester anion represented by Formula 1. The fact that the compound having the ammonium salt structure of the alkyl ester anion represented by Formula 1 is contained in the magnetic layer can be confirmed by performing analysis with respect to the magnetic tape by X-ray photoelectron spectroscopy (electron spectroscopy for chemical analysis (ESCA)), infrared spectroscopy (IR), or the like.

In one embodiment, the ammonium cation represented by $Z^+$ can be provided by, for example, the nitrogen atom of the nitrogen-containing polymer becoming a cation. The nitrogen-containing polymer means a polymer containing a nitrogen atom. In the present invention and the present specification, a term "polymer" means to include both a homopolymer and a copolymer. The nitrogen atom can be included as an atom configuring a main chain of the polymer in one aspect, and can be included as an atom constituting a side chain of the polymer in one aspect.

As one aspect of the nitrogen-containing polymer, polyalkyleneimine can be used. The polyalkyleneimine is a ring-opening polymer of alkyleneimine and is a polymer having a plurality of repeating units represented by Formula 2.

Formula 2

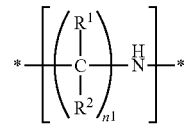

The nitrogen atom N configuring the main chain in Formula 2 can be converted to a nitrogen cation $N^+$ to provide an ammonium cation represented by $Z^+$ in Formula 1. Then, an ammonium salt structure can be formed with the alkyl ester anion, for example, as follows.

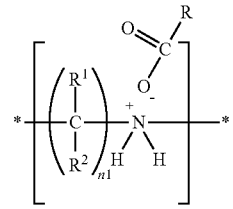

Hereinafter, Formula 2 will be described in more detail.

In Formula 2, $R^1$ and $R^2$ each independently represent a hydrogen atom or an alkyl group, and n1 represents an integer of 2 or more.

Examples of the alkyl group represented by $R^1$ or $R^2$ include an alkyl group having 1 to 6 carbon atoms, preferably an alkyl group having 1 to 3 carbon atoms, more preferably a methyl group or an ethyl group, and even more preferably a methyl group. The alkyl group represented by $R^1$ or $R^2$ is preferably an unsubstituted alkyl group. A combination of $R^1$ and $R^2$ in Formula 2 is a form in which one is a hydrogen atom and the other is an alkyl group, a form in which both are hydrogen atoms, and a form in which both are an alkyl group (the same or different alkyl groups), and is preferably a form in which both are hydrogen atoms.

As the alkyleneimine that provides the polyalkyleneimine, a structure of the ring that has the smallest number of carbon atoms is ethyleneimine, and the main chain of the alkyleneimine (ethyleneimine) obtained by ring opening of ethyleneimine has 2 carbon atoms. Accordingly, n1 in Formula 2 is 2 or more. n1 in Formula 2 can be, for example, 10 or less, 8 or less, 6 or less, or 4 or less. The polyalkyleneimine may be a homopolymer containing only the same structure as the repeating structure represented by Formula 2, or may be a copolymer containing two or more different structures as the repeating structure represented by Formula 2. A number average molecular weight of the polyalkyleneimine that can be used to form the compound having the ammonium salt structure of the alkyl ester anion represented by Formula 1 can be, for example, equal to or greater than 200, and is preferably equal to or greater than 300, and more preferably equal to or greater than 400. In addition, the number average molecular weight of the polyalkyleneimine can be, for example, equal to or less than 10,000, and is preferably equal to or less than 5,000 and more preferably equal to or less than 2,000.

In the present invention and the present specification, the average molecular weight (weight-average molecular weight and number average molecular weight) is measured by gel permeation chromatography (GPC) and is a value obtained by performing standard polystyrene conversion. Unless otherwise noted, the average molecular weights shown in the examples which will be described below are values (polystyrene-equivalent values) obtained by standard polystyrene conversion of the values measured under the following measurement conditions using GPC.

GPC device: HLC-8220 (manufactured by Tosoh Corporation)

Guard Column: TSK guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three kinds of columns are linked in series)

Eluent: Tetrahydrofuran (THF), including stabilizer (2,6-di-t-butyl-4-methylphenol)

Eluent flow rate: 0.35 mL/min

Column temperature: 40° C.

Inlet temperature: 40° C.

Refractive index (RI) measurement temperature: 40° C.

Sample concentration: 0.3% by mass

Sample injection amount: 10 μL

In addition, as the other aspect of the nitrogen-containing polymer, polyallylamine can be used. The polyallylamine is a polymer of allylamine and is a polymer having a plurality of repeating units represented by Formula 3.

Formula 3

The nitrogen atom N configuring an amino group of a side chain in Formula 3 can be converted to a nitrogen cation N⁺ to provide an ammonium cation represented by $Z^+$ in Formula 1. Then, an ammonium salt structure can be formed with the alkyl ester anion, for example, as follows.

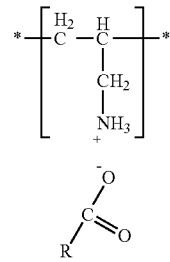

A weight-average molecular weight of the polyallylamine that can be used to form the compound having the ammonium salt structure of the alkyl ester anion represented by Formula 1 can be, for example, equal to or greater than 200, and is preferably equal to or greater than 1,000, and more preferably equal to or greater than 1,500. In addition, the weight-average molecular weight of the polyallylamine can be, for example, equal to or less than 15,000, and is preferably equal to or less than 10,000 and more preferably equal to or less than 8,000.

The fact that the compound having a structure derived from polyalkyleneimine or polyallylamine as the compound having the ammonium salt structure of the alkyl ester anion represented by Formula 1 is included can be confirmed by analyzing the surface of the magnetic layer by a time-of-flight secondary ion mass spectrometry (TOF-SIMS) or the like.

The compound having the ammonium salt structure of the alkyl ester anion represented by Formula 1 can be salt of a nitrogen-containing polymer and one or more fatty acids selected from the group consisting of fatty acids having 7 or more carbon atoms and fluorinated fatty acids having 7 or more carbon atoms. The nitrogen-containing polymer forming salt can be one kind or two or more kinds of nitrogen-containing polymers, and can be, for example, a nitrogen-containing polymer selected from the group consisting of polyalkyleneimine and polyallylamine. The fatty acids forming the salt can be one kind or two or more kinds of fatty acids selected from the group consisting of fatty acids having 7 or more carbon atoms and fluorinated fatty acids having 7 or more carbon atoms. The fluorinated fatty acid has a structure in which some or all of the hydrogen atoms configuring the alkyl group bonded to a carboxy group COOH in the fatty acid are substituted with fluorine atoms. For example, the salt forming reaction can easily proceed by mixing the nitrogen-containing polymer and the fatty acids described above at room temperature. The room temperature is, for example, approximately 20° C. to 25° C. In one embodiment, one or more kinds of nitrogen-containing polymers and one or more kinds of the fatty acids described above are used as components of the magnetic layer forming composition, and the salt forming reaction can proceed by mixing these in the step of preparing the magnetic layer forming composition. In one embodiment, one or more kinds of nitrogen-containing polymers and one or more kinds of the fatty acids described above are mixed to form a salt before preparing the magnetic layer forming composition, and then, the magnetic layer forming composition can be prepared using this salt as a component of the magnetic layer forming composition. This point also applies to a case of forming a non-magnetic layer including a compound having an ammonium salt structure of an alkyl ester anion represented by Formula 1. For example, for the magnetic layer, 0.1 to 10.0 parts by mass of the nitrogen-containing polymer can be used and 0.5 to 8.0 parts by mass of the nitrogen-containing polymer is preferably used with respect to 100.0 parts by mass of ferromagnetic powder. The used amount of the fatty acids described above can be, for example, 0.05 to 10.0 parts by mass and is preferably 0.1 to 5.0 parts by mass, with respect to 100.0 parts by mass of ferromagnetic powder. In addition, for the non-magnetic layer, 0.1 to 10.0 parts by mass of the nitrogen-containing polymer can be used and 0.5 to 8.0 parts by mass of the nitrogen-containing polymer is preferably used with respect to 100.0 parts by mass of non-magnetic powder. The used amount of the fatty acids described above can be, for example, 0.05 to 10.0 parts by mass and is preferably 0.1 to 5.0 parts by mass, with respect to 100.0 parts by mass of non-magnetic powder. In a case where the nitrogen-containing polymer and the fatty acid are mixed to form an ammonium salt of the alkyl ester anion represented by Formula 1, the nitrogen atom configuring the nitrogen-containing polymer and the carboxy group of the fatty acid may be reacted to form the following structure, and an aspect including such structures are also included in the above compound.

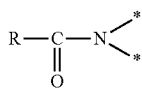

Examples of the fatty acids include fatty acids having an alkyl group described above as R in Formula 1 and fluorinated fatty acids having a fluorinated alkyl group described above as R in Formula 1.

A mixing ratio of the nitrogen-containing polymer and the fatty acid used to form the compound having the ammonium salt structure of the alkyl ester anion represented by Formula 1 is preferably 10:90 to 90:10, more preferably 20:80 to 85:15, and even more preferably 30:70 to 80:20, as a mass ratio of nitrogen-containing polymer:fatty acid. In addition, the compound having the ammonium salt structure of the alkyl ester anion represented by Formula 1 that is contained in the magnetic layer is preferably 0.01 parts by mass or more, more preferably 0.1 parts by mass, even more preferably 0.5 parts by mass with respect to 100.0 parts by mass of the ferromagnetic powder. Here, a content of the compound in the magnetic layer means a total amount of the amount of the liquid film formed on the surface of the magnetic layer and the amount contained in the magnetic layer. On the other hand, it is preferable that a content of the ferromagnetic powder in the magnetic layer is high from a viewpoint of high-density recording. Therefore, from a viewpoint of high-density recording, it is preferable that a content of components other than the ferromagnetic powder is small. From this viewpoint, the content of the compound in the magnetic layer is preferably 15.0 parts by mass or less, more preferably 10.0 parts by mass or less, and even more preferably 8.0 parts by mass or less with respect to 100.0 parts by mass of the ferromagnetic powder. In addition, the same applies to the preferable range of the content of the compound in the magnetic layer forming composition used for forming the magnetic layer.

The magnetic layer may further contain one or more lubricants. As an example of the lubricant, a fatty acid amide that can function as a boundary lubricant can be used. It is considered that the boundary lubricant is a lubricant which can be adsorbed to a surface of powder (for example, ferromagnetic powder) and form a rigid lubricant film to decrease contact friction. Examples of fatty acid amide include amide of various fatty acids such as lauric acid, myristic acid, palmitic acid, stearic acid, oleic acid, linoleic acid, linolenic acid, behenic acid, erucic acid, and elaidic acid, and specifically, lauric acid amide, myristic acid amide, palmitic acid amide, stearic acid amide, and the like. The content of fatty acid amide in the magnetic layer is, for example, 0 to 3.0 parts by mass, preferably 0 to 2.0 parts by mass, and more preferably 0 to 1.0 parts by mass with respect to 100.0 parts by mass of the ferromagnetic powder. In addition, the non-magnetic layer may also contain fatty acid amide. The content of fatty acid amide in the non-magnetic layer is, for example, 0 to 3.0 parts by mass and is preferably 0 to 1.0 parts by mass with respect to 100.0 parts by mass of non-magnetic powder. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to.

Regarding the suppressing of a deterioration in electromagnetic conversion characteristics in a case of performing the recording data on a magnetic tape and/or reproducing the recorded data at different head tilt angles, the inventors of the present invention consider as follows.

It is surmised that, in a case where the head tilt angle is different, as described above, a degree of abrasion of the magnetic tape head due to contact with the magnetic tape head greatly changes during the recording and/or reproducing (large variation occurs in degree of abrasion). It is considered that the large variation in degree of abrasion is a factor of a deterioration in electromagnetic conversion characteristics.

Meanwhile, it is considered that the abrasion is affected by a size and a content of the abrasive, a shear stress on the magnetic head (which may affect the friction properties), a normal force and the like. Since the normal force tends to increase as the value of the head tilt angle increases, it is considered that the abrasive bites into the magnetic head becomes deeper, the friction increases, and the abrasion increases. On the other hand, for example, the use of the compound described above, which is considered to be able to function as a liquid lubricant, as a component of the magnetic layer leads to an increase in lubricity (sliding properties) of the surface of the magnetic layer, and can contribute to suppressing of the occurrence of a large variation in degree of abrasion of the magnetic head due to a difference in head tilt angle. In addition, for the abrasive, it is surmised that the larger the amount of the abrasive contained in the magnetic layer, the more likely the abrasion of the magnetic head occurs in a case where the head tilt angle is large. In a case where the head tilt angle is small, in a case where a plurality of abrasives having different sizes are used as components of the magnetic layer, it is surmised that the abrasives having a larger size are more likely to cause abrasion of the magnetic head.

With respect to the above points, the inventors of the present invention consider that, the use of the compound described above as the component used as the lubricant for forming the magnetic layer, the combination of the abrasive used, and/or the adjustment of the content of the abrasive can contribute to the suppressing of the values of the AlFeSil abrasion value$_{45°}$ and the standard deviation of the AlFeSil abrasion value. In addition, it is surmised that controlling the values of the AlFeSil abrasion value$_{45°}$ and the standard deviation of the AlFeSil abrasion value to be in the ranges described above can lead to the suppressing of the deterioration in electromagnetic conversion characteristics in a case of performing the recording and/or reproducing of data on the magnetic tape at different head tilt angles.

Non-Magnetic Layer

Next, the non-magnetic layer will be described. The magnetic tape may include a magnetic layer directly on the non-magnetic support or may include a non-magnetic layer containing the non-magnetic powder between the non-magnetic support and the magnetic layer. The non-magnetic powder used for the non-magnetic layer may be a powder of an inorganic substance (inorganic powder) or a powder of an organic substance (organic powder). In addition, carbon black and the like can be used. Examples of the inorganic substance include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50% to 90% by mass and more preferably in a range of 60% to 90% by mass with respect to a total mass of the non-magnetic layer.

The non-magnetic layer can include a binding agent and can also include additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer containing a small amount of ferromagnetic powder as impurities, or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The tape may or may not include a back coating layer including a non-magnetic powder on a surface side of the non-magnetic support opposite to the surface side provided with the magnetic layer. The back coating layer preferably includes any one or both of carbon black and inorganic powder. The back coating layer can include a binding agent and can also include additives. For the details of the non-magnetic powder, the binding agent included in the back coating layer and various additives, a well-known technology regarding the back coating layer can be applied, and a well-known technology regarding the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

Regarding a thickness (total thickness) of the magnetic tape, it has been required to increase recording capacity (increase in capacity) of the magnetic tape along with the enormous increase in amount of information in recent years. As a unit for increasing the capacity, a thickness of the magnetic tape is reduced and a length of the magnetic tape accommodated in one reel of the magnetic tape cartridge is increased. From this point, the thickness (total thickness) of the magnetic tape is preferably 5.6 µm or less, more preferably 5.5 µm or less, even more preferably 5.4 µm or less, still preferably 5.3 µm or less, still more preferably 5.2 µm or less, still even more preferably 5.0 µm or less, and still further preferably 4.8 µm or less. In addition, from a viewpoint of ease of handling, the thickness of the magnetic tape is preferably 3.0 µm or more and more preferably 3.5 µm or more.

The thickness (total thickness) of the magnetic tape can be measured by the following method.

Ten tape samples (for example, length of 5 to 10 cm) are cut out from a random portion of the magnetic tape, these tape samples are overlapped, and the thickness is measured. A value which is one tenth of the measured thickness (thickness per one tape sample) is set as the tape thickness. The thickness measurement can be performed using a well-known measurement device capable of performing the thickness measurement at 0.1 µm order.

A thickness of the non-magnetic support is preferably 3.0 to 5.0 µm.

A thickness of the magnetic layer can be optimized according to a saturation magnetization amount of a magnetic head used, a head gap length, a recording signal band, and the like, is normally 0.01 µm to 0.15 µm, and is preferably 0.02 µm to 0.12 µm and more preferably 0.03 µm to 0.1 µm, from a viewpoint of realization of high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.1 to 1.5 µm, preferably 0.1 to 1.0 µm, and more preferably 0.1 to 0.7 µm.

A thickness of the back coating layer is preferably equal to or smaller than 0.9 µm and more preferably 0.1 to 0.7 µm.

Various thicknesses such as the thickness of the magnetic layer and the like can be obtained by the following method.

A cross section of the magnetic tape in the thickness direction is exposed with an ion beam and the cross section observation of the exposed cross section is performed using a scanning electron microscope or a transmission electron microscope. Various thicknesses can be obtained as the arithmetic average of the thicknesses obtained at two random portions in the cross section observation. Alternatively, various thicknesses can be obtained as a designed thickness calculated under the manufacturing conditions.

Manufacturing Method

Preparation of Each Layer Forming Composition

Composition for forming the magnetic layer, the non-magnetic layer, or the back coating layer generally includes a solvent, together with the various components described above. As the solvent, various organic solvents generally used for manufacturing a coating type magnetic recording medium can be used. Among them, from a viewpoint of the solubility of the binding agent usually used for the coating type magnetic recording medium, each layer forming composition preferably contains one or more of a ketone solvent such as acetone, methyl ethyl ketone, methyl isobutyl ketone, diisobutyl ketone, cyclohexanone, isophorone, and tetrahydrofuran. The amount of solvent in each layer forming composition is not particularly limited, and can be identical to that in each layer forming composition of a typical coating type magnetic recording medium. In addition, a step of preparing each layer forming composition can generally include at least a kneading step, a dispersing step, and a mixing step provided before and after these steps, as necessary. Each step may be divided into two or more stages. The component used in the preparation of each layer forming composition may be added at an initial stage or in a middle stage of each step. In addition, each component may be separately added in two or more steps. For example, a binding agent may be separately added in a kneading step, a dispersing step, and a mixing step for adjusting viscosity after the dispersion. In addition, as described above, one or more kinds of nitrogen-containing polymers and one or more kinds of the fatty acids described above are used as components of the magnetic layer forming composition, and the salt forming reaction can proceed by mixing these in the step of preparing the magnetic layer forming composition. In one embodiment, one or more kinds of nitrogen-containing polymers and one or more kinds of the fatty acids described above are mixed to form a salt before preparing the magnetic layer forming composition, and then, the magnetic layer forming composition can be prepared using this salt as a component of the magnetic layer forming composition. This point also applies to a step of preparing the non-magnetic layer forming composition. The abrasive solution is preferably prepared by dispersing separately from the ferromagnetic powder and the projection formation agent. The abrasive solution is preferably prepared as one or more abrasive solutions containing an abrasive, a solvent, and preferably a binding agent, separately from the ferromagnetic powder and the projection formation agent, and can be used in the preparation of the magnetic layer forming composition. A dispersion process and/or a classification process can be performed for the preparation of the abrasive solution. A commercially available device can be used for these processes.

In the manufacturing step of the magnetic tape, a well-known manufacturing technology of the related art can be used as a part of step or the entire step. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-79274A (JP-H01-79274A) can be referred to. In addition, glass beads and/or other beads can be used to disperse each layer forming composition. As such dispersion beads, zirconia beads, titania beads, and steel beads which are dispersion beads having high specific gravity are suitable. These dispersion beads is preferably used by optimizing a particle diameter (bead diameter) and a filling percentage of these dispersion beads. As a disperser, a well-known dispersion device can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

Regarding the dispersion process of the magnetic layer forming composition, in one aspect, the dispersion process of the ferromagnetic powder is performed by the two-stage dispersion process. A coarse aggregate of the ferromagnetic powder is crushed by a first stage dispersion process. After that, a second stage dispersion process in which a collision energy applied to the particles of the ferromagnetic powder by the collision with the dispersion beads is smaller than that in the first dispersion process can be performed. It is considered that such dispersion process makes it possible to improve the dispersibility of the ferromagnetic powder and prevent the occurrence of chipping (partially lacking particles).

As an example of the two-stage dispersion process described above, a dispersion process including a first stage of obtaining a dispersion liquid by performing the dispersion process of a ferromagnetic powder, a binding agent, and a solvent in the presence of first dispersion beads, and a second stage of performing the dispersion process of a dispersion liquid obtained in the first stage in the presence of second dispersion beads having a bead diameter and a density smaller than those of the first dispersion beads. Hereinafter, the dispersion process described above will be in detail.

In order to improve the dispersibility of the ferromagnetic powder, it is preferable that the first stage and the second stage described above are performed as a dispersion process before mixing the ferromagnetic powder with other powder components. For example, it is preferable to perform the first stage and the second stage as the dispersion process of a liquid (magnetic liquid) containing a ferromagnetic powder, a binding agent, a solvent, and optionally added additives before mixing with an abrasive and a projection formation agent.

A bead diameter of the second dispersion beads is preferably 1/100 or less, and more preferably 1/500 or less of a bead diameter of the first dispersion beads. In addition, the bead diameter of the second dispersion beads can be, for example, 1/10,000 or more of the bead diameter of the first dispersion beads. However, there is no limitation to this range. For example, the bead diameter of the second dispersion beads is preferably in a range of 80 to 1,000 nm. Meanwhile, the bead diameter of the first dispersion beads can be, for example, in a range of 0.2 to 1.0 mm.

In the present invention and the present specification, the bead diameter is a value measured by the same method as the method for measuring the average particle size of powder described above.

The above second stage is preferably performed under the condition in which the second dispersion beads are present in an amount of 10 times or more the amount of the ferromagnetic hexagonal ferrite powder based on mass, and more preferably performed under the condition in which the amount is 10 to 30 times thereof.

Meanwhile, the amount of the first dispersion beads in the first stage is also preferably in the above range.

The second dispersion beads are beads having a density lower than that of the first dispersion beads. The "density" is obtained by dividing the mass (unit: g) of dispersion beads by the volume (unit: $cm^3$). The measurement is performed by the Archimedes method. The density of the second dispersion beads is preferably equal to or less than 3.7 g/cm$^3$ and more preferably equal to or less than 3.5 g/cm$^3$. The density of the second dispersion beads may be, for example, equal to or greater than 2.0 g/cm$^3$ or may be less than 2.0 g/cm$^3$. Examples of preferred second dispersion beads in terms of density include diamond beads, silicon carbide beads, silicon nitride beads, and the like, and examples of preferred second dispersion beads in terms of density and hardness include diamond beads.

On the other hand, the first dispersion beads are preferably dispersion beads having a density greater than 3.7 g/cm$^3$, more preferably dispersion beads having a density equal to or greater than 3.8 g/cm$^3$, and even more preferably dispersion beads having a density equal to or greater than 4.0 g/cm$^3$. The density of the first dispersion beads may be, for example, equal to or less than 7.0 g/cm$^3$ or may be greater than 7.0 g/cm$^3$. As the first dispersion beads, zirconia beads, alumina beads, and the like are preferably used, and zirconia beads are more preferably used.

The dispersion time is not particularly limited and may be set according to a type of a disperser used.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. In an case of performing an alignment process, while the coating layer of the magnetic layer forming composition is wet, the alignment process is performed with respect to the coating layer in an alignment zone. For the alignment process, various technologies disclosed in a paragraph 0052 of JP2010-24113A can be applied. For example, a homeotropic alignment process can be performed by a well-known method such as a method using a different polar facing magnet. In the alignment zone, a drying speed of the coating layer can be controlled by a temperature and an air flow of the dry air and/or a transporting rate in the alignment zone. In addition, the coating layer may be preliminarily dried before transporting to the alignment zone.

The back coating layer can be formed by applying a back coating layer forming composition onto a side of the non-magnetic support opposite to the side provided with the magnetic layer (or to be provided with the magnetic layer). For details of the coating for forming each layer, a description disclosed in a paragraph 0066 of JP2010-231843A can be referred to.

Other Steps

After performing the coating step described above, a calendar process is usually performed in order to improve surface smoothness of the magnetic tape. For calendar conditions, a calendar pressure is, for example, 200 to 500 kN/m and preferably 250 to 350 kN/m, a calendar temperature (surface temperature of calendar roll) is, for example, 85° C. to 120° C. and preferably 90° C. to 120° C., and a calendar speed is, for example, 50 to 300 m/min and preferably 80 to 200 m/min. As the calendar process conditions are reinforced (for example, as the calendar temperature is set to be high), the surface of the magnetic layer is smoothed, and the value of the magnetic layer surface Ra tends to decrease. In addition, as a roll having a hard surface is used as a calendar roll, or as the number of stages is increased, the surface of the magnetic layer is smoothed and the value of the magnetic layer surface Ra tends to decrease.

For various other steps for manufacturing a magnetic tape, a description disclosed in paragraphs 0067 to 0070 of JP2010-231843A can be referred to.

Through various steps, a long magnetic tape raw material can be obtained. The obtained magnetic tape raw material is, for example, cut (slit) by a well-known cutter to have a width of a magnetic tape to be accommodated in the magnetic tape cartridge. The width can be determined according to the standard and is normally ½ inches. 1 inch=2.54 cm.

In the magnetic tape obtained by slitting, normally, a servo pattern can be formed.

Heat Treatment

In one embodiment, the magnetic tape can be a magnetic tape manufactured through the following heat treatment. In another aspect, the magnetic tape can be manufactured without the following heat treatment.

The heat treatment can be performed in a state where the magnetic tape slit and cut to have a width determined according to the standard is wound around a core member.

In one embodiment, the heat treatment is performed in a state where the magnetic tape is wound around the core member for heat treatment (hereinafter, referred to as a "core for heat treatment"), the magnetic tape after the heat treatment is wound around a cartridge reel of the magnetic tape cartridge, and a magnetic tape cartridge in which the magnetic tape is wound around the cartridge reel can be manufactured.

The core for heat treatment can be formed of metal, a resin, or paper. The material of the core for heat treatment is preferably a material having high stiffness, from a viewpoint of preventing the occurrence of a winding defect such as spoking or the like. From this viewpoint, the core for heat treatment is preferably formed of metal or a resin. In addition, as an index for stiffness, a bending elastic modulus of the material for the core for heat treatment is preferably equal to or greater than 0.2 GPa (gigapascal) and more preferably equal to or greater than 0.3 GPa. Meanwhile, since the material having high stiffness is normally expensive, the use of the core for heat treatment of the material having stiffness exceeding the stiffness capable of preventing the occurrence of the winding defect causes the cost increase. By considering the viewpoint described above, the bending elastic modulus of the material for the core for heat treatment is preferably equal to or smaller than 250 GPa. The bending elastic modulus is a value measured based on international organization for standardization (ISO) 178 and the bending elastic modulus of various materials is well known. In addition, the core for heat treatment can be a solid or hollow core member. In a case of a hollow shape, a wall thickness is preferably equal to or greater than 2 mm, from a viewpoint of maintaining the stiffness. In addition, the core for heat treatment may include or may not include a flange.

The magnetic tape having a length equal to or greater than a length to be finally accommodated in the magnetic tape cartridge (hereinafter, referred to as a "final product length") is prepared as the magnetic tape wound around the core for heat treatment, and it is preferable to perform the heat treatment by placing the magnetic tape in the heat treatment environment, in a state where the magnetic tape is wound around the core for heat treatment. The magnetic tape length wound around the core for heat treatment is equal to or greater than the final product length, and is preferably the "final product length+α", from a viewpoint of ease of winding around the core for heat treatment. This α is preferably equal to or greater than 5 m, from a viewpoint of ease of the winding. The tension in a case of winding around the core for heat treatment is preferably equal to or greater than 0.1 N (newton). In addition, from a viewpoint of preventing the occurrence of excessive deformation during the manufacturing, the tension in a case of winding around the core for heat treatment is preferably equal to or smaller than 1.5 N and more preferably equal to or smaller than 1.0 N. An outer diameter of the core for heat treatment is preferably equal to or greater than 20 mm and more preferably equal to or greater than 40 mm, from viewpoints of ease of the winding and preventing coiling (curl in longitudinal direction). The outer diameter of the core for heat treatment is preferably equal to or smaller than 100 mm and more preferably equal to or smaller than 90 mm. A width of the core for heat treatment may be equal to or greater than the width of the magnetic tape wound around this core. In addition, after the heat treatment, in a case of detaching the magnetic tape from the core for heat treatment, it is preferable that the magnetic tape and the core for heat treatment are sufficiently cooled and magnetic tape is detached from the core for heat treatment, in order to prevent the occurrence of the tape deformation which is not intended during the detaching operation. It is preferable the detached magnetic tape is wound around another core temporarily (referred to as a "core for temporary winding"), and the magnetic tape is wound around a cartridge reel (generally, outer diameter is appropriately 40 to 50 mm) of the magnetic tape cartridge from the core for temporary winding. Accordingly, a relationship between the inside and the outside with respect to the core for heat treatment of the magnetic tape in a case of the heat treatment can be maintained and the magnetic tape can be wound around the cartridge reel of the magnetic tape cartridge. Regarding the details of the core for temporary winding and the tension in a case of winding the magnetic tape around the core, the description described above regarding the core for heat treatment can be referred to. In an aspect in which the heat treatment is subjected to the magnetic tape having a length of the "final product length+α", the length corresponding to "+α" may be cut in any stage. For example, in one aspect, the magnetic tape having the final product length may be wound around the reel of the magnetic tape cartridge from the core for temporary winding and the remaining length corresponding the "+α" may be cut. From a viewpoint of decreasing the amount of the portion to be cut out and removed, the α is preferably equal to or smaller than 20 m.

The specific aspect of the heat treatment performed in a state of being wound around the core member as described above is described below.

An atmosphere temperature for performing the heat treatment (hereinafter, referred to as a "heat treatment temperature") is preferably equal to or higher than 40° C. and more preferably equal to or higher than 50° C. On the other hand, from a viewpoint of preventing the excessive deformation, the heat treatment temperature is preferably equal to or lower than 75° C., more preferably equal to or lower than 70° C., and even more preferably equal to or lower than 65° C.

A weight absolute humidity of the atmosphere for performing the heat treatment is preferably equal to or greater than 0.1 g/kg Dry air and more preferably equal to or greater than 1 g/kg Dry air. The atmosphere in which the weight absolute humidity is in the range described above is preferable, because it can be prepared without using a special device for decreasing moisture. On the other hand, the weight absolute humidity is preferably equal to or smaller than 70 g/kg Dry air and more preferably equal to or smaller than 66 g/kg Dry air, from a viewpoint of preventing a deterioration in workability by dew condensation. The heat treatment time is preferably equal to or longer than 0.3 hours and more preferably equal to or longer than 0.5 hours. In addition, the heat treatment time is preferably equal to or shorter than 48 hours, from a viewpoint of production efficiency.

Regarding the control of the standard deviation of the curvature described above, as any value of the heat treatment temperature, heat treatment time, bending elastic modulus of a core for the heat treatment, and tension at the time of winding around the core for the heat treatment is large, the value of the curvature tends to further decrease.

Formation of Servo Pattern

The "formation of the servo pattern" can be "recording of a servo signal". The formation of the servo pattern will be described below.

The servo pattern is generally formed along a longitudinal direction of the magnetic tape. As a system of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. In the invention and the specification, the "timing-based servo pattern" refers to a servo pattern that enables head tracking in a servo system of a timing-based servo system. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of servo patterns continuous in the longitudinal direction of the magnetic tape. A plurality of servo bands are normally provided on the magnetic tape. For example, the number thereof is 5 in the LTO tape. A region interposed between two adjacent servo bands is a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, a plurality of the groups of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes is shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head generally includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo pattern to be formed. The width of each gap can be set as, for example, equal to or smaller than 1 μm, 1 to 10 or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by applying the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing is opposite to each other. Accordingly, the output of the servo signal obtained by the reading of the servo pattern can be increased. As disclosed in JP2012-53940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

Vertical Squareness Ratio

In one embodiment, the vertical squareness ratio of the magnetic tape can be, for example, 0.55 or more. From a viewpoint of improving the electromagnetic conversion characteristics, the vertical squareness ratio of the magnetic tape is preferably 0.60 or more, and more preferably 0.65 or more. In principle, an upper limit of the squareness ratio is 1.00 or less. The vertical squareness ratio of the magnetic tape can be 1.00 or less, 0.95 or less, 0.90 or less, 0.85 or less, or 0.80 or less. It is preferable that the value of the vertical squareness ratio of the magnetic tape is large from a viewpoint of improving the electromagnetic conversion characteristics. The vertical squareness ratio of the magnetic tape can be controlled by a well-known method such as performing a homeotropic alignment process.

In the invention and the specification, the "vertical squareness ratio" is squareness ratio measured in the vertical direction of the magnetic tape. The "vertical direction" described with respect to the squareness ratio is a direction orthogonal to the surface of the magnetic layer, and can also be referred to as a thickness direction. In the invention and the specification, the vertical squareness ratio is obtained by the following method.

A sample piece having a size that can be introduced into an oscillation sample type magnetic-flux meter is cut out from the magnetic tape to be measured. Regarding the sample piece, using the oscillation sample type magnetic-flux meter, a magnetic field is applied to a vertical direction of a sample piece (direction orthogonal to the surface of the magnetic layer) with a maximum applied magnetic field of 3979 kA/m, a measurement temperature of 296 K, and a magnetic field sweep speed of 8.3 kA/m/sec, and a magnetization strength of the sample piece with respect to the applied magnetic field is measured. The measured value of the magnetization strength is obtained as a value after diamagnetic field correction and a value obtained by subtracting magnetization of a sample probe of the oscillation sample type magnetic-flux meter as background noise. In a case where the magnetization strength at the maximum applied magnetic field is Ms and the magnetization strength at zero applied magnetic field is Mr, the squareness ratio SQ is a value calculated as SQ=Mr/Ms. The measurement temperature is referred to as a temperature of the sample piece, and by setting the ambient temperature around the sample piece to a measurement temperature, the temperature of the sample piece can be set to the measurement temperature by realizing temperature equilibrium.

Magnetic Tape Cartridge

According to another aspect of the invention, there is provided a magnetic tape cartridge comprising the magnetic tape described above.

The details of the magnetic tape included in the magnetic tape cartridge are as described above.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device in order to record and/or reproduce data on the magnetic tape, the magnetic tape is drawn from the magnetic tape cartridge and wound around the reel on the magnetic tape device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape device side. In the meantime, the magnetic head comes into contact with and slides on the surface of the magnetic layer of the magnetic tape, and accordingly, the recording and/or reproducing of data is performed. With respect to this, in the twin reel type magnetic tape cartridge, both reels of the supply reel and the winding reel are provided in the magnetic tape cartridge.

In one aspect, the magnetic tape cartridge can include a cartridge memory. The cartridge memory can be, for example, a non-volatile memory, and head tilt angle adjustment information is recorded in advance or head tilt angle adjustment information is recorded. The head tilt angle adjustment information is information for adjusting the head tilt angle during the running of the magnetic tape in the magnetic tape device. For example, as the head tilt angle adjustment information, a value of the servo band spacing at each position in the longitudinal direction of the magnetic tape at the time of data recording can be recorded. For example, in a case where the data recorded on the magnetic tape is reproduced, the value of the servo band spacing is measured at the time of the reproducing, and the head tilt angle can be changed by the control device of the magnetic tape device so that an absolute value of a difference of the servo band spacing at the time of recording at the same longitudinal position recorded in the cartridge memory is close to 0. The head tilt angle can be, for example, the angle θ described above.

The magnetic tape and the magnetic tape cartridge can be suitably used in the magnetic tape device (that is, magnetic recording and reproducing system) for performing recording and/or reproducing data at different head tilt angles. In such a magnetic tape device, in one embodiment, it is possible to perform the recording and/or reproducing of data by changing the head tilt angle during running of a magnetic tape. For example, the head tilt angle can be changed according to dimensional information of the magnetic tape in the width direction obtained while the magnetic tape is running. In addition, for example, in a usage aspect, a head tilt angle during the recording and/or reproducing at a certain time and a head tilt angle during the recording and/or reproducing at the next time and subsequent times are changed, and then the head tilt angle may be fixed without changing during the running of the magnetic tape for the recording and/or reproducing of each time. In any usage aspect, a magnetic tape having a small deterioration in electromagnetic conversion characteristics in a case of performing the recording and/or reproducing of data at different head tilt angles is preferable.

Magnetic Tape Device

According to still another aspect of the invention, there is provided a magnetic tape device comprising the magnetic tape described above. In the magnetic tape device, the recording of data on the magnetic tape and/or the reproducing of data recorded on the magnetic tape can be performed by bringing the surface of the magnetic layer of the magnetic tape into contact with the magnetic head and sliding. The magnetic tape device can attachably and detachably include the magnetic tape cartridge according to one aspect of the invention.

The magnetic tape cartridge can be attached to a magnetic tape device provided with a magnetic head and used for performing the recording and/or reproducing of data. In the invention and the specification, the "magnetic tape device" means a device capable of performing at least one of the recording of data on the magnetic tape or the reproducing of data recorded on the magnetic tape. Such a device is generally called a drive.

Magnetic Head

The magnetic tape device can include a magnetic head. The configuration of the magnetic head and the angle θ, which is the head tilt angle, are as described above with reference to FIGS. 1 to 3. In a case where the magnetic head includes a reproducing element, as the reproducing element, a magnetoresistive (MR) element capable of reading information recorded on the magnetic tape with excellent sensitivity is preferable. As the MR element, various well-known MR elements (for example, a Giant Magnetoresistive (GMR) element, or a Tunnel Magnetoresistive (TMR) element) can be used. Hereinafter, the magnetic head which records data and/or reproduces the recorded data is also referred to as a "recording and reproducing head". The element for recording data (recording element) and the element for reproducing data (reproducing element) are collectively referred to as a "magnetic head element".

By reproducing data using the reproducing element having a narrow reproducing element width as the reproducing element, the data recorded at high density can be reproduced with high sensitivity. From this viewpoint, the reproducing element width of the reproducing element is preferably 0.8 μm or less. The reproducing element width of the reproducing element can be, for example, 0.3 μm or more. However, it is also preferable to fall below this value from the above viewpoint.

Here, the "reproducing element width" refers to a physical dimension of the reproducing element width. Such physical dimensions can be measured with an optical microscope, a scanning electron microscope, or the like.

In a case of recording data and/or reproducing recorded data, first, tracking using a servo signal can be performed. That is, as the servo signal reading element follows a predetermined servo track, the magnetic head element can be controlled to pass on the target data track. The movement of the data track is performed by changing the servo track to be read by the servo signal reading element in the tape width direction.

In addition, the recording and reproducing head can perform the recording and/or reproducing with respect to other data bands. In this case, the servo signal reading element is moved to a predetermined servo band by using the UDIM information described above, and the tracking with respect to the servo band may be started.

Figure 5:
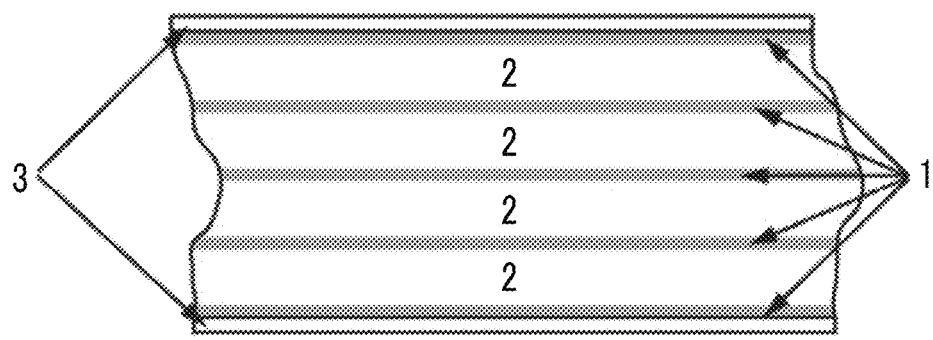
FIG. 5 shows an example of disposition of data bands and servo bands.
Figure 6:
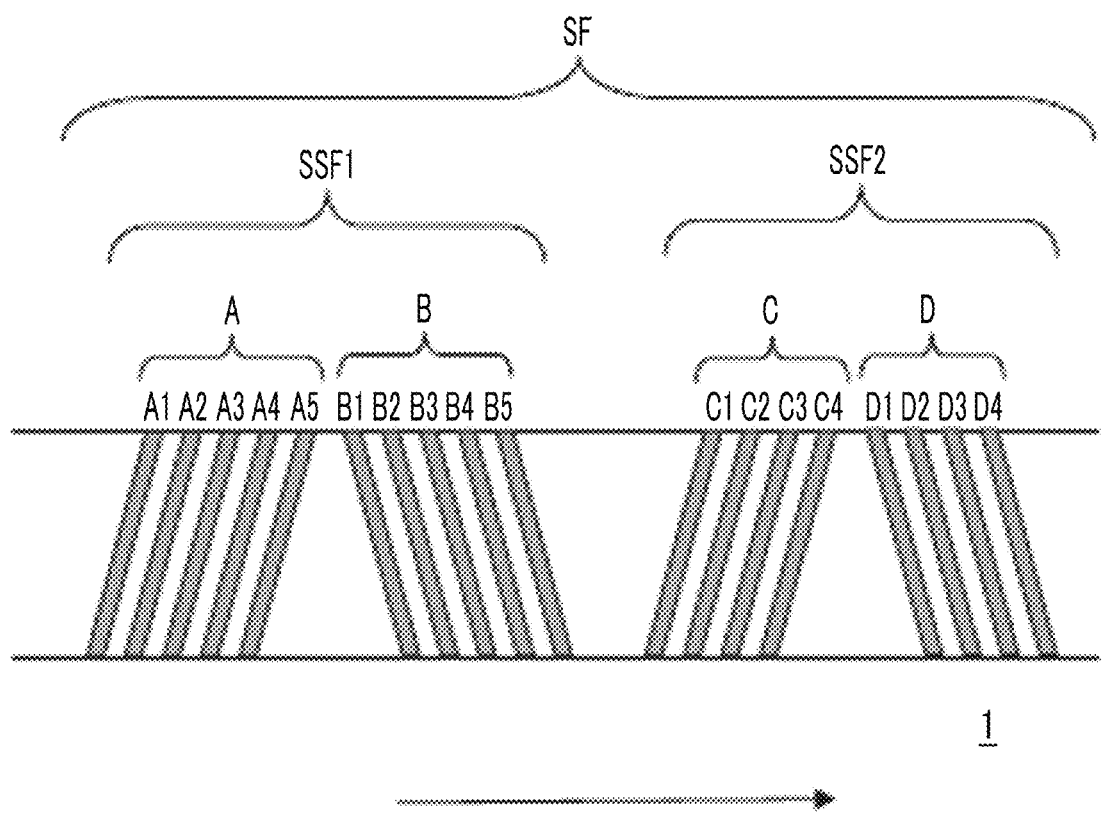
FIG. 6 shows a servo pattern disposition example of a linear tape-open (LTO) Ultrium format tape.

FIG. 5 shows an example of disposition of data bands and servo bands. In FIG. 5, a plurality of servo bands 1 are disposed to be interposed between guide bands 3 in a magnetic layer of a magnetic tape MT. A plurality of regions 2 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 6 are formed on a servo band, in a case of manufacturing a magnetic tape. Specifically, in FIG. 6, a servo frame SF on the servo band 1 is configured with a servo sub-frame 1 (SSF1) and a servo sub-frame 2 (SSF2). The servo sub-frame 1 is configured with an A burst (in FIG. 6, reference numeral A) and a B burst (in FIG. 6, reference numeral B). The A burst is configured with servo patterns A1 to A5 and the B burst is configured with servo patterns B1 to B5. Meanwhile, the servo sub-frame 2 is configured with a C burst (in FIG. 6, reference numeral C) and a D burst (in FIG. 6, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 6 shows one servo frame for explaining. However, in practice, in the magnetic layer of the magnetic tape in which the head tracking servo in the timing-based servo system is performed, a plurality of servo frames are disposed in each servo band in a running direction. In FIG. 6, an arrow shows a magnetic tape running direction. For example, an LTO Ultrium format tape generally includes 5,000 or more servo frames per a tape length of 1 m, in each servo band of the magnetic layer.

In the magnetic tape device, the head tilt angle can be changed while the magnetic tape is running in the magnetic tape device. The head tilt angle is, for example, an angle θ formed by the axis of the element array with respect to the width direction of the magnetic tape. The angle θ is as described above. For example, by providing an angle adjustment unit for adjusting the angle of the module of the magnetic head in the recording and reproducing head unit of the magnetic head, the angle θ can be variably adjusted during the running of the magnetic tape. Such an angle adjustment unit can include, for example, a rotation mechanism for rotating the module. For the angle adjustment unit, a well-known technology can be applied.

Regarding the head tilt angle during the running of the magnetic tape, in a case where the magnetic head includes a plurality of modules, the angle θ described with reference to FIGS. 1 to 3 can be specified for the randomly selected module. The angle θ at the start of running of the magnetic tape, $\theta_{initial}$, can be set to 0° or more or more than 0°. As the $\theta_{initial}$ is large, a change amount of the effective distance between the servo signal reading elements with respect to a change amount of the angle θ increases, and accordingly, it is preferable from a viewpoint of adjustment ability for adjusting the effective distance between the servo signal reading elements according to the dimension change of the width direction of the magnetic tape. From this viewpoint, the $\theta_{initial}$ is preferably 1° or more, more preferably 5° or more, and even more preferably 10° or more. Meanwhile, regarding an angle (generally referred to as a "lap angle") formed by a surface of the magnetic layer and a contact surface of the magnetic head in a case where the magnetic tape runs and comes into contact with the magnetic head, a deviation in a tape width direction which is kept small is effective in improving uniformity of friction in the tape width direction which is generated by the contact between the magnetic head and the magnetic tape during the running of the magnetic tape. In addition, it is desirable to improve the uniformity of the friction in the tape width direction from a viewpoint of position followability and the running stability of the magnetic head. From a viewpoint of reducing the deviation of the lap angle in the tape width direction, $\theta_{initial}$ is preferably 45° or less, more preferably 40° or less, and even more preferably 35° or less.

Regarding the change of the angle θ during the running of the magnetic tape, while the magnetic tape is running in the magnetic tape device in order to record data on the magnetic tape and/or to reproduce data recorded on the magnetic tape, in a case where the angle θ of the magnetic head changes from $\theta_{initial}$ at the start of running, a maximum change amount Δθ of the angle θ during the running of the magnetic tape is a larger value among $\Delta\theta_{max}$ and $\Delta\theta_{min}$ calculated by the following equation. A maximum value of the angle θ during the running of the magnetic tape is $\theta_{max}$, and a minimum value thereof is $\theta_{min}$. In addition, "max" is an abbreviation for maximum, and "min" is an abbreviation for minimum.

$$\Delta\theta_{max} = \theta_{max} - \theta_{initial} \text{ and}$$

$$\Delta\theta_{min} = \theta_{initial} - \theta_{min}.$$

In one embodiment, the Δθ can be more than 0.000°, and is preferably 0.001° or more and more preferably 0.010° or more, from a viewpoint of adjustment ability for adjusting the effective distance between the servo signal reading elements according to the dimension change in the width direction of the magnetic tape. In addition, from a viewpoint of ease of ensuring synchronization of recorded data and/or reproduced data between a plurality of magnetic head elements during data recording and/or reproducing, the Δθ is preferably 1.000° or less, more preferably 0.900° or less, even more preferably 0.800° or less, still preferably 0.700° or less, and still more preferably 0.600° or less.

In the examples shown in FIGS. 2 and 3, the axis of the element array is tilted toward a magnetic tape running direction. However, the present invention is not limited to such an example. The present invention also includes an embodiment in which the axis of the element array is tilted in a direction opposite to the magnetic tape running direction in the magnetic tape device.

The head tilt angle $\theta_{initial}$ at the start of the running of the magnetic tape can be set by a control device or the like of the magnetic tape device.

Figure 7:
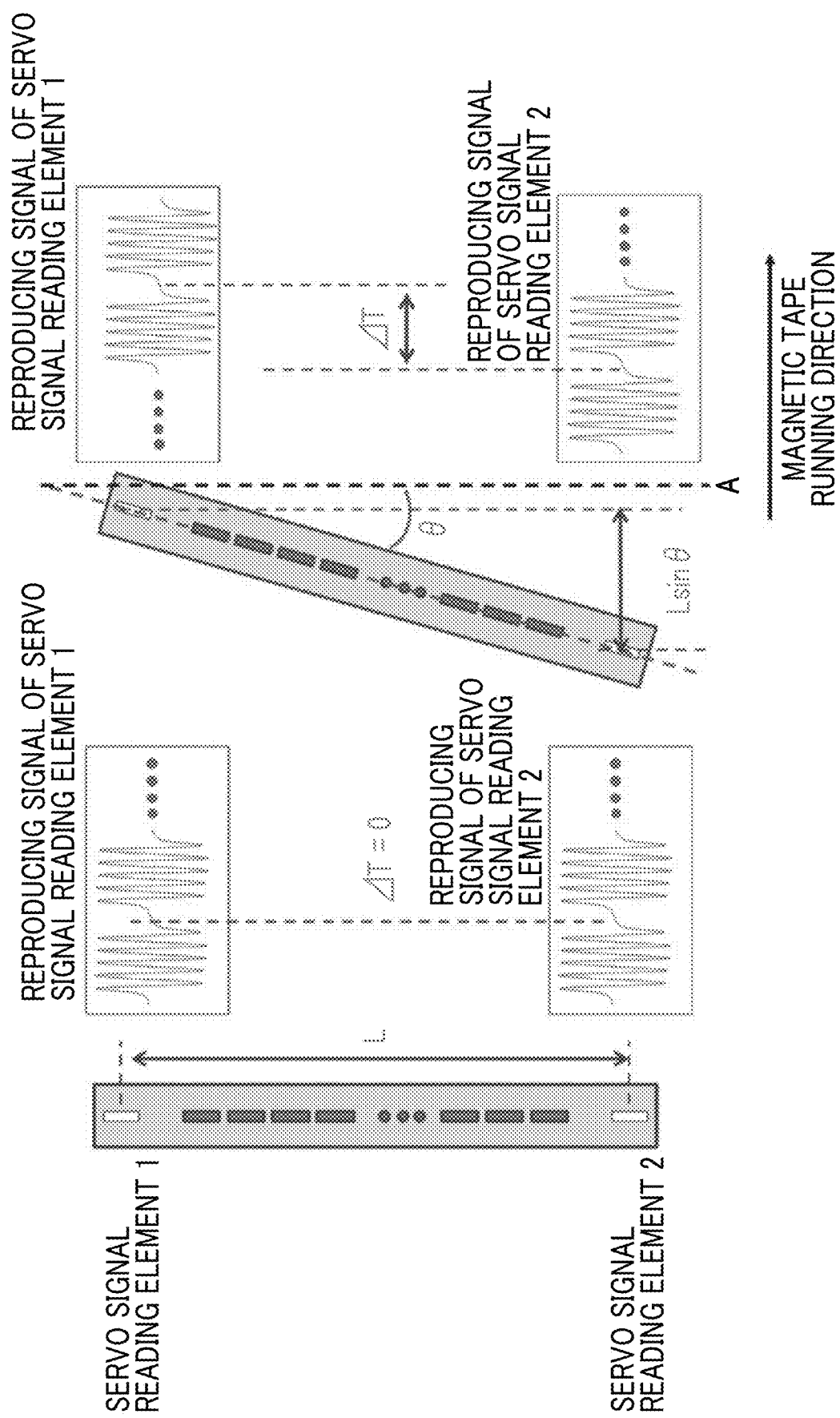
FIG. 7 is an explanatory diagram of a method for measuring the angle θ during the running of the magnetic tape.

Regarding the head tilt angle during the running of the magnetic tape, FIG. 7 is an explanatory diagram of a method for measuring the angle θ during the running of the magnetic tape. The angle θ during the running of the magnetic tape can be obtained, for example, by the following method. In a case where the angle θ during traveling on the magnetic tape is obtained by the following method, the angle θ is changed in a range of 0° to 90° during the running of the magnetic tape. That is, in a case where the axis of the element array is tilted toward the magnetic tape running direction at the start of running of the magnetic tape, the element array is not tilted so that the axis of the element array tilts toward a direction opposite to the magnetic tape running direction at the start of the running of the magnetic tape, during the running of the magnetic tape, and in a case where the axis of the element array is tilted toward the direction opposite to the magnetic tape running direction at the start of running of the magnetic tape, the element array is not tilted so that the axis of the element array tilts toward the magnetic tape running direction at the start of the running of the magnetic tape, during the running of the magnetic tape.

A phase difference (that is, time difference) $\Delta T$ of reproduction signals of the pair of servo signal reading elements 1 and 2 is measured. The measurement of $\Delta T$ can be performed by a measurement unit provided in the magnetic tape device. A configuration of such a measurement unit is well known. A distance L between a central portion of the servo signal reading element 1 and a central portion of the servo signal reading element 2 can be measured with an optical microscope or the like. In a case where a running speed of the magnetic tape is defined as a speed v, the distance in the magnetic tape running direction between the central portions of the two servo signal reading elements is set to $L \sin \theta$, and a relationship of $L \sin \theta = v \times \Delta T$ is satisfied. Therefore, the angle $\theta$ during the running of the magnetic tape can be calculated by a formula "$\theta = \arcsin(v\Delta T/L)$". The right drawing of FIG. 7 shows an example in which the axis of the element array is tilted toward the magnetic tape running direction. In this example, the phase difference (that is, time difference) $\Delta T$ of a phase of the reproduction signal of the servo signal reading element 2 with respect to a phase of the reproduction signal of the servo signal reading element 1 is measured. In a case where the axis of the element array is tilted toward the direction opposite to the running direction of the magnetic tape, $\theta$ can be obtained by the method described above, except for measuring $\Delta T$ as the phase difference (that is, time difference) of the phase of the reproduction signal of the servo signal reading element 1 with respect to the phase of the reproduction signal of the servo signal reading element 2.

For a measurement pitch of the angle $\theta$, that is, a measurement interval of the angle $\theta$ in a tape longitudinal direction, a suitable pitch can be selected according to a frequency of tape width deformation in the tape longitudinal direction. As an example, the measurement pitch can be, for example, 250 μm.

Configuration of Magnetic Tape Device

Figure 8:
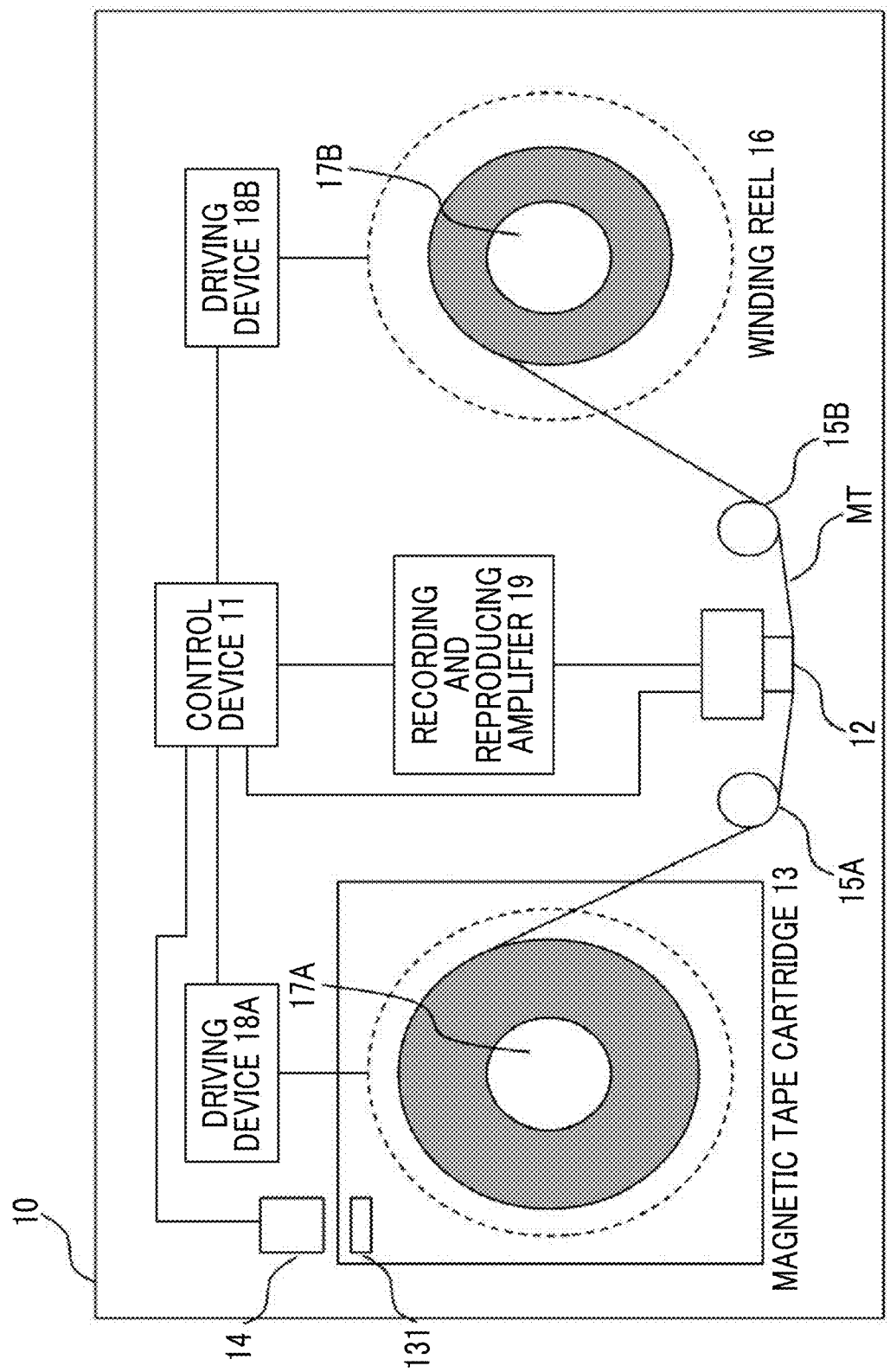
FIG. 8 is a schematic view showing an example of the magnetic tape device.

A magnetic tape device 10 shown in FIG. 8 controls a recording and reproducing head unit 12 in accordance with a command from a control device 11 to record and reproduce data on a magnetic tape MT.

The magnetic tape device 10 has a configuration of detecting and adjusting a tension applied in a longitudinal direction of the magnetic tape from spindle motors 17A and 17B and driving devices 18A and 18B which rotatably control a magnetic tape cartridge reel and a winding reel.

The magnetic tape device 10 has a configuration in which the magnetic tape cartridge 13 can be mounted.

The magnetic tape device 10 includes a cartridge memory read and write device 14 capable of performing reading and writing with respect to the cartridge memory 131 in the magnetic tape cartridge 13.

An end portion or a leader pin of the magnetic tape MT is pulled out from the magnetic tape cartridge 13 mounted on the magnetic tape device 10 by an automatic loading mechanism or manually and passes on a recording and reproducing head through guide rollers 15A and 15B so that a surface of a magnetic layer of the magnetic tape MT comes into contact with a surface of the recording and reproducing head of the recording and reproducing head unit 12, and accordingly, the magnetic tape MT is wound around the winding reel 16.

The rotation and torque of the spindle motor 17A and the spindle motor 17B are controlled by a signal from the control device 11, and the magnetic tape MT runs at random speed and tension. A servo pattern previously formed on the magnetic tape can be used to control the tape speed and control the head tilt angle. A tension detection mechanism may be provided between the magnetic tape cartridge 13 and the winding reel 16 to detect the tension. The tension may be controlled by using the guide rollers 15A and 15B in addition to the control by the spindle motors 17A and 17B.

The cartridge memory read and write device 14 is configured to be able to read and write information of the cartridge memory 131 according to commands from the control device 11. As a communication system between the cartridge memory read and write device 14 and the cartridge memory 131, for example, an international organization for standardization (ISO) 14443 system can be used.

The control device 11 includes, for example, a controller, a storage unit, a communication unit, and the like.

The recording and reproducing head unit 12 is composed of, for example, a recording and reproducing head, a servo tracking actuator for adjusting a position of the recording and reproducing head in a track width direction, a recording and reproducing amplifier 19, a connector cable for connecting to the control device 11. The recording and reproducing head is composed of, for example, a recording element for recording data on a magnetic tape, a reproducing element for reproducing data of the magnetic tape, and a servo signal reading element for reading a servo signal recorded on the magnetic tape. For example, one or more of each of the recording elements, the reproducing element, and the servo signal reading element are mounted in one magnetic head. Alternatively, each element may be separately provided in a plurality of magnetic heads according to a running direction of the magnetic tape.

The recording and reproducing head unit 12 is configured to be able to record data on the magnetic tape MT according to a command from the control device 11. In addition, the data recorded on the magnetic tape MT can be reproduced according to a command from the control device 11.

The control device 11 has a mechanism of controlling the servo tracking actuator so as to obtain a running position of the magnetic tape from a servo signal read from a servo band during the running of the magnetic tape MT and position the recording element and/or the reproducing element at a target running position (track position). The control of the track position is performed by feedback control, for example. The control device 11 has a mechanism of obtaining a servo band spacing from servo signals read from two adjacent servo bands during the running of the magnetic tape MT. The control device 11 can store the obtained information of the servo band spacing in the storage unit inside the control device 11, the cartridge memory 131, an external connection device, and the like. In addition, the control device 11 can change the head tilt angle according to the dimensional information in the width direction of the magnetic tape during the running. Accordingly, it is possible to bring the effective distance between the servo signal reading elements closer to or match the spacing of the servo bands. The dimensional information can be obtained by using the servo pattern previously formed on the magnetic tape. For example, by doing so, the angle $\theta$ formed by the axis of the element array with respect to the width direction of the magnetic tape can be changed during the running of the magnetic tape in the magnetic tape device according to dimensional information of the magnetic tape in the width direction obtained during the running. The head tilt angle can be adjusted, for example, by feedback control. Alternatively, for example, the head tilt angle can also be adjusted by a method disclosed in JP2016-524774A or US2019/0164573A1.

EXAMPLES

Hereinafter, the invention will be described with reference to examples. However, the invention is not limited to the embodiments shown in the examples. "Parts" and "%" in the following description mean "parts by mass" and "mass %", unless otherwise noted. Steps and evaluations described below are performed in an environment of an atmosphere temperature of 23° C.±1° C., unless otherwise noted. Further, "eq" described below indicates an equivalent which is a unit which cannot be converted into the SI unit system.
Ferromagnetic Powder In Table 2, "BaFe" is a hexagonal barium ferrite powder having an average particle size (average plate diameter) of 21 nm.

In Table 2, "SrFe1" is a hexagonal strontium ferrite powder produced by the following method.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a melting temperature of 1,390° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 $nm^3$, an anisotropy constant Ku was $2.2 \times 10^5$ $J/m^3$, and a mass magnetization σs was 49 $A \times m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the conditions of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degree In Table 2, "SrFe2" is a hexagonal strontium ferrite powder produced by the following method.

1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a melting temperature of 1,380° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1,102 nm$^3$, an anisotropy constant Ku was 2.0×10$^5$ J/m$^3$, and a mass magnetization as was 50 A×m$^2$/kg.

In Table 2, "ε-iron oxide" is an ε-iron oxide powder produced by the following method.

4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1,000° C. was filled with the obtained precursor of ferromagnetic powder in the atmosphere and subjected to heat treatment for 4 hours.

The heat-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the heat-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-Ga$_{0.28}$Co$_{0.05}$TiO$_{0.05}$Fe$_{1.62}$O$_3$) was obtained. In addition, the X-ray diffraction analysis was performed under the same conditions as disclosed regarding SrFe1 above, and it was confirmed that the obtained ferromagnetic powder has a crystal structure of a single phase which is an ε phase not including a crystal structure of an a phase and a y phase (ε-iron oxide type crystal structure) from the peak of the X-ray diffraction pattern.

Regarding the obtained (ε-iron oxide powder, an average particle size was 12 nm, an activation volume was 746 nm$^3$, an anisotropy constant Ku was 1.2×10$^5$ J/m$^3$, and a mass magnetization as was 16 A×m$^2$/kg.

The activation volume and the anisotropy constant Ku of the hexagonal strontium ferrite powder and the ε-iron oxide powder are values obtained by the method described above regarding each ferromagnetic powder by using an oscillation sample type magnetic-flux meter (manufactured by Toei Industry Co., Ltd.).

The mass magnetization as is a value measured using an oscillation sample type magnetic-flux meter (manufactured by Toei Industry Co., Ltd.) at a magnetic field strength of 15 kOe.

Preparation of Abrasive Solution
Preparation of Abrasive Solution A

The amount of 2,3-dihydroxynaphthalene (manufactured by Tokyo Chemical Industry Co., Ltd.) shown in Table 1, 31.3 parts of a 32% solution (solvent is a mixed solvent of methyl ethyl ketone and toluene) of a containing polyester polyurethane resin having an SO$_3$Na group as a polar group (UR-4800 (polar group amount: 80 meq/kg) manufactured by Toyobo Co., Ltd.), and 570.0 parts of a mixed mixed liquid of methyl ethyl ketone and cyclohexanone (mass ratio of 1:1) as a solvent were mixed with respect to 100.0 parts of abrasive (alumina powder) shown in Table 1, and dispersed in the presence of zirconia beads (bead diameter: 0.1 mm) by a paint shaker for the time shown in Table 1 (bead dispersion time).

After the dispersion, the dispersion liquid obtained by separating the dispersion liquid and the beads with a mesh was subjected to a centrifugal separation process. The centrifugal separation process was performed by using CS150GXL manufactured by Hitachi Koki Co., Ltd. (a rotor used is S100AT6 manufactured by Hitachi Koki Co., Ltd.) as a centrifugal separator for the time (centrifugal separation time) shown in Table 1 at a rotation speed (rpm; rotation per minute) shown in Table 1. By this centrifugal separation process, particles having a relatively large particle size are precipitated, and particles having a relatively small particle size are dispersed in a supernatant.

Then, the supernatant was collected by decantation. This collected liquid is referred to as an "abrasive solution A".

Preparation of Abrasive Solutions B and C

An abrasive solution B and an abrasive solution C were prepared in the same manner as in the preparation of the abrasive solution A, except that various items were changed as shown in Table 1.

TABLE 1

|  |  | Abrasive solution A | Abrasive solution B | Abrasive solution C |
|---|---|---|---|---|
| Preparation of abrasive solution | Abrasive product name (manufactured by Sumitomo Chemical Co., Ltd.) | Hit80 | Hit70 | Hit70 |
|  | BET specific surface area of abrasive (m$^2$/g) | 30 | 20 | 20 |

TABLE 1-continued

|  |  | Abrasive solution A | Abrasive solution B | Abrasive solution C |
|---|---|---|---|---|
| Content of abrasive liquid dispersing agent (2,3-dihydroxynaphthalene) | | 3.0 parts by mass | 3.0 parts by mass | 0 parts by mass |
| Beads dispersion time | | 360 min | 180 min | 60 min |
| Centrifugal separation | Rotation rate | 5500 rpm | 3500 rpm | 1000 rpm |
|  | Centrifugal separation time | 4 min | 4 min | 4 min |

Example 1

Preparation of Magnetic Layer Forming Composition
Magnetic Liquid
    Ferromagnetic powder (see Table 2): 100.0 parts
    Oleic acid: 2.0 parts
    Vinyl chloride copolymer (MR-104 manufactured by ZEON CORPORATION): 10.0 parts
    $SO_3Na$ group-containing polyurethane resin: 4.0 parts
    (Weight-average molecular weight: 70,000, $SO_3Na$ group content: 0.07 meq/g)
    Polyalkyleneimine-based polymer (synthetic product obtained by the method disclosed in paragraphs 0115 to 0123 of JP2016-51493A): 6.0 parts
    Methyl ethyl ketone: 150.0 parts
    Cyclohexanone: 150.0 parts
Abrasive Solution
    The abrasive solution shown in Table 2 is used with the amount of abrasive in the abrasive solution shown in Table 2.
Other Components
    Carbon black (average particle size: 20 nm): 0.7 part
    Polyethyleneimine (manufactured by Nippon Shokubai Co., Ltd., number average molecular weight: 300): 2.0 parts
    Stearic acid: 0.5 parts
    Stearic acid amide: 0.3 parts
    Butyl stearate: 6.0 parts
    Methyl ethyl ketone: 110.0 parts
    Cyclohexanone: 110.0 parts
    Polyisocyanate (CORONATE (registered product) L manufactured by Tosoh Corporation): 3.0 parts
Preparation Method A dispersion liquid A was prepared by dispersing (first stage) various components of the magnetic liquid described above with a batch type vertical sand mill by using zirconia beads having a bead diameter of 0.5 mm (first dispersion beads, density of 6.0 g/cm³) for 24 hours, and then performing filtering with a filter having a hole diameter of 0.5 μm. The zirconia beads were used in an amount of 10 times the mass of the ferromagnetic powder based on mass.

Then, the dispersion liquid A was dispersed by a batch type vertical sand mill for 1 hour using diamond beads having a bead diameter of 500 nm (second dispersion beads, density of 3.5 g/cm³) (second stage), and a dispersion liquid (dispersion liquid B) in which diamond beads were separated was prepared using a centrifugal separator. The diamond beads were used in an amount of 10 times the mass of the ferromagnetic powder based on mass.

The dispersion liquid B, the abrasive solution, and the other components described above were introduced into a dissolver stirrer, and stirred at a circumferential speed of 10 m/sec for 360 minutes. Then, after performing ultrasonic dispersion process for 60 minutes with a flow type ultrasonic disperser at a flow rate of 7.5 kg/min, the magnetic layer forming composition was prepared by filtering three times with a filter having a hole diameter of 0.3

Preparation of Non-Magnetic Layer Forming Composition

A non-magnetic layer forming composition was prepared by dispersing various components of the non-magnetic layer forming composition described below with a batch type vertical sand mill by using zirconia beads having a bead diameter of 0.1 mm for 24 hours, and then performing filtering with a filter having a hole diameter of 0.5 μm.

Non-Magnetic Inorganic Powder
    α-iron oxide: 100.0 parts
    (Average particle size: 10 nm, BET specific surface area: 75 m²/g)
    Carbon black: 25.0 parts
    (Average particle size: 20 nm)
    $SO_3Na$ group-containing polyurethane resin: 18.0 parts
    (Weight-average molecular weight: 70,000, $SO_3Na$ group content: 0.2 meq/g)
    Stearic acid: 1.0 part
    Cyclohexanone: 300.0 parts
    Methyl ethyl ketone: 300.0 parts Preparation of Back Coating Layer Forming Composition Components except a lubricant (stearic acid and butyl stearate), polyisocyanate, and 200.0 parts of cyclohexanone among various components of the back coating layer forming composition were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having a hole diameter of 1 μm and a back coating layer forming composition was prepared.

Non-Magnetic Inorganic Powder
    α-iron oxide: 80.0 parts
    (Average particle size: 0.15 μm, BET specific surface area: 52 m²/g)
    Carbon black: 20.0 parts
    Average particle size: 20 nm
    Vinyl chloride copolymer: 13.0 parts
    A sulfonic acid salt group-containing polyurethane resin: 6.0 parts
    Phenylphosphonic acid: 3.0 parts
    Cyclohexanone: 155.0 parts
    Methyl ethyl ketone: 155.0 parts
    Stearic acid: 3.0 parts
    Butyl stearate: 3.0 parts
    Polyisocyanate: 5.0 parts
    Cyclohexanone: 200.0 parts Manufacturing of Magnetic Tape and Magnetic Tape Cartridge The non-magnetic layer forming composition prepared in the section was applied to a surface of a support made of polyethylene naphthalate having a thickness of 4.1 μm so that the thickness after the drying becomes 0.7 μm and was dried to form a non-magnetic layer.

Then, the magnetic layer forming composition prepared as described above was applied onto the non-magnetic layer so that the thickness after the drying is 0.1 μm, and a coating layer was formed.

After that, a homeotropic alignment process was performed by applying a magnetic field having a magnetic field strength of 0.3 T in a vertical direction with respect to a surface of a coating layer, while the coating layer of the magnetic layer forming composition is wet. Then, the drying was performed to form the magnetic layer.

After that, the back coating layer forming composition prepared as described above was applied to the surface of the support on a side opposite to the surface where the non-magnetic layer and the magnetic layer were formed, so that the thickness after the drying becomes 0.3 μm, and was dried to form a back coating layer.

After that, a surface smoothing treatment (calender process) was performed by using a calender roll configured of only a metal roll, at a speed of 100 m/min, linear pressure of 300 kg/cm, and a calender temperature (surface temperature of a calender roll) shown in Table 2. By doing so, a long magnetic tape raw material was obtained.

Then, after the heat treatment for 36 hours in an environment of an atmosphere temperature of 70° C., a long magnetic tape raw material was slit into a ½ inches width to obtain a magnetic tape.

By recording a servo signal on a magnetic layer of the obtained magnetic tape with a commercially available servo writer, the magnetic tape including a data band, a servo band, and a guide band in the disposition according to a linear-tape-open (LTO) Ultrium format, and including a servo pattern (timing-based servo pattern) having the disposition and shape according to the LTO Ultrium format on the servo band was obtained. The servo pattern formed by doing so is a servo pattern disclosed in Japanese Industrial Standards (JIS) X6175:2006 and Standard ECMA-319 (June 2001). The total number of servo bands is five, and the total number of data bands is four. A magnetic tape (length of 960 m) on which the servo signal was recorded as described above was wound around the reel of the magnetic tape cartridge (LTO Ultrium 8 data cartridge), and a leader tape according to Article 9 of Section 3 of standard European Computer Manufacturers Association (ECMA)-319 (June 2001) was bonded to an end thereof by using a commercially available splicing tape.

By doing so, a magnetic tape cartridge in which the magnetic tape was wound around the reel was manufactured.

It can be confirmed by the following method that the magnetic layer of the magnetic tape contains a compound formed of polyethyleneimine and stearic acid and having an ammonium salt structure of an alkyl ester anion represented by Formula 1.

A sample is cut out from a magnetic tape, and X-ray photoelectron spectroscopy analysis is performed on the surface of the magnetic layer (measurement area: 300 μm×700 μm) using an ESCA device. Specifically, wide scan measurement is performed by the ESCA device under the following measurement conditions. In the measurement results, peaks are confirmed at a position of a binding energy of the ester anion and a position of a binding energy of the ammonium cation.

Device: AXIS-ULTRA manufactured by Shimadzu Corporation
Excited X-ray source: Monochromatic Al—Kα ray
Scan range: 0 to 1,200 eV
Pass energy: 160 eV
Energy resolution: 1 eV/step
Capturing Time: 100 ms/step
Number of times of integration: 5

In addition, a sample piece having a length of 3 cm is cut out from the magnetic tape, and attenuated total reflection-fourier transform-infrared spectrum (ATR-FT-IR) measurement (reflection method) is performed on the surface of the magnetic layer, and, in the measurement result, the absorption is confirmed on a wave number corresponding to absorption of COO$^-$ (1,540 cm$^{-1}$ or 1,430 cm$^{-1}$) and a wave number corresponding to the absorption of the ammonium cation (2,400 cm$^{-1}$).

Examples 2 to 22 and Comparative Examples 1 to 28

A magnetic tape and a magnetic tape cartridge were obtained by the method described in Example 1, except that the items shown in Table 2 were changed as shown in Table 2.

For Examples 19 to 22 and Comparative Examples 25 to 28, the step after recording the servo signal was changed as follows. That is, the heat treatment was performed after recording the servo signal. On the other hand, in other examples and comparative examples, since such heat treatment was not performed, "None" was shown in the column of "heat treatment condition" in Table 2.

For Examples 19 to 22 and Comparative Examples 25 to 28, the magnetic tape (length of 970 m) after recording the servo signal as described in Example 1 was wound around a core for the heat treatment and heat-treated in a state of being wound around the core. As the core for heat treatment, a solid core member (outer diameter: 50 mm) formed of a resin and having a value of a bending elastic modulus shown in Table 2 was used, and the tension in a case of the winding was set as a value shown in Table 2. The heat treatment temperature and heat treatment time in the heat treatment were set to values shown in Table 2. The weight absolute humidity in the atmosphere in which the heat treatment was performed was 10 g/kg Dry air.

After the heat treatment, the magnetic tape and the core for heat treatment were sufficiently cooled, the magnetic tape was detached from the core for heat treatment and wound around the core for temporary winding, and then, the magnetic tape having the final product length (960 m) was wound around the reel of the magnetic tape cartridge (LTO Ultrium 8 data cartridge) from the core for temporary winding. The remaining length of 10 m was cut out and the leader tape based on section 9 of Standard European Computer Manufacturers Association (ECMA)-319 (June 2001) Section 3 was bonded to the end of the cut side by using a commercially available splicing tape.

As the core for temporary winding, a solid core member having the same outer diameter and formed of the same material as the core for heat treatment was used, and the tension at the time of winding was set as 0.6 N.

By doing so, a magnetic tape cartridge in which the magnetic tape was wound around the reel was manufactured.

For each of the Examples and Comparative Examples, six magnetic tape cartridges were manufactured, one was used for the evaluation regarding the electromagnetic conversion characteristics below, another one was used for the evaluation regarding the deterioration in electromagnetic conversion characteristics below, and the other four were used for the evaluations (1) to (4) of the magnetic tape.

Evaluation of Electromagnetic Conversion Characteristics (Signal-to-Noise Ratio (SNR))

The magnetic tapes taken out from each of magnetic tape cartridges of the examples and the comparative examples were attached to each of the ½-inch reel testers, and the electromagnetic conversion characteristics (signal-to-noise ratio (SNR)) were evaluated by the following methods. In the following evaluation, the head tilt angle was set to 0°.

In an environment of a temperature of 23° C. and a relative humidity of 50%, a tension of 0.70 N was applied in the longitudinal direction of the magnetic tape, and recording and reproduction were performed for 10 passes. A relative speed of the magnetic head and the magnetic tape was set as 6 m/sec. The recording was performed by using a metal-in-gap (MIG) head (gap length of 0.15 track width of 1.0 µm) as the recording head and by setting a recording current as an optimal recording current of each magnetic tape. The reproduction was performed using a giant-magnetoresistive (GMR) head (element thickness of 15 nm, shield interval of 0.1 reproducing element width of 0.8 µm) as the reproduction head. A signal having a linear recording density of 350 kfci was recorded, the reproduction signal was measured with a spectrum analyzer manufactured by ShibaSoku Co., Ltd, and an SNR was obtained from the measurement result. In Table 2, the SNR is shown as a relative value with respect to Comparative Example 1. In addition, the unit kfci is a unit of linear recording density (cannot be converted to SI unit system). As the signal, a sufficiently stabilized portion of the signal after starting the running of the magnetic tape was used.

Evaluation regarding Deterioration in Electromagnetic Conversion Characteristics (Reduction Amount of Signal-to-Noise Ratio (SNR))

The reduction amount of SNR was obtained as the evaluation regarding the deterioration in electromagnetic conversion characteristics by the following method. The following recording and reproducing were performed using a ½ inch reel tester with a fixed magnetic head, and performed four times in total by changing the head tilt angle sequentially in the order of 0°, 15°, 30°, and 45°. The head tilt angle is an angle θ formed by the axis of the element array of the reproducing module describe below with respect to the width direction of the magnetic tape at the start of each time of running. The angle θ was set by the control device of the magnetic tape device at the start of each time of running of the magnetic tape, and the head tilt angle was fixed during each time of running of the magnetic tape.

For each magnetic tape (total length of magnetic tape: 960 m) of Examples and Comparative Examples, in the environment with a temperature of 23° C. and a relative humidity of 50%, 1000 passes of the recording and reproducing were performed by applying a tension of 1.5 N (hereinafter, referred to as a "running tension") in the longitudinal direction of the magnetic tape, and then 1000 passes of the recording and reproducing were performed by applying a tension of 0.2 N in the longitudinal direction of the magnetic tape. a relative speed of the magnetic tape and the magnetic head is 8 m/sec, and in the magnetic head used, the arrangement order of the modules is "recording module-reproducing module-recording module" (total number of modules: 3). The number of magnetic head elements in each module is 32 (Ch0 to Ch31), and the element array is configured by sandwiching these magnetic head elements between the pair of servo signal reading elements. The recording element of the recording module is a Metal-in-gap (MIG) element (gap length of 0.15 track width of 1.0 µm), and the recording is performed by setting a recording current to an optimum recording current of each magnetic tape. The reproducing element of the reproducing module is a giant-magnetoresistive (GMR) element (element thickness of 15 nm, shield interval of 0.1 µm, reproducing element width of 0.8 µm). A signal having a linear recording density of 300 kfci was recorded, and the reproduction signal was measured with a spectrum analyzer manufactured by ShibaSoku Co., Ltd. As the signal, a sufficiently stabilized portion of the signal after starting the running of the magnetic tape was used.

At each time, a difference between a SNR of a first pass at a running tension of 1.5 N and a SNR of a 1000th pass at a running tension of 0.2 N (SNR of the 1000th pass at the running tension of 0.2 N-SNR of first pass at the running tension of 1.5 N) was calculated and set to the SNR reduction amount. An arithmetic average of the SNR reduction amount obtained for the four different head tilt angles is shown in a column of "SNR reduction amount" in Table 2.

Evaluation of Magnetic Tape (1) Arithmetic Average Roughness Ra Measured at Surface of Magnetic Layer with Atomic Force Microscope (Magnetic Layer Surface Ra)

The arithmetic average roughness Ra of the surface of the magnetic layer of the magnetic tape extracted from each of the magnetic tape cartridges of Examples and Comparative Examples was obtained by the method described above.

(2) AlFeSil Abrasion Value$_{45}°$ and Standard Deviation of Alfesil Abrasion Value The magnetic tape was extracted from each of the magnetic tape cartridges of Examples and Comparative Examples, and the AlFeSil abrasion value$_{45}°$ and the standard deviation of the AlFeSil abrasion value were obtained by the method described above in the environment with the temperature of 23° C. and the relative humidity of 50%.

(3) Standard Deviation of Curvature of Magnetic Tape in Longitudinal Direction

The magnetic tape was taken out from each of the magnetic tape cartridges of examples and comparative examples, and the standard deviation of the curvature of the magnetic tape in the longitudinal direction was determined by the method described above.

(4) Tape Thickness 10 tape samples (length: 5 cm) were cut out from any part of the magnetic tape extracted from each of the magnetic tape cartridges of Examples and Comparative Examples, and these tape samples were stacked to measure the thickness. The thickness was measured using a digital thickness gauge of a Millimar 1240 compact amplifier manufactured by MARH and a Millimar 1301 induction probe. The value (thickness per tape sample) obtained by calculating 1/10 of the measured thickness was defined as the tape thickness. For all of the magnetic tape, the tape thickness was 5.2 µm.

The result described above is shown in Table 2 (Tables 2-1 and 2-2).

TABLE 2-1

| | Magnetic layer forming composition | | | | | | Heat treatment conditions | | | |
|---|---|---|---|---|---|---|---|---|---|---|
| | Ferro-magnetic powder | Polyethyl-eneimine Present or absent of | Stearic acid Present or absent of | Abrasive amount (parts) | | | Calendar process Calendar | | | Bending elastic modulus | Tension in case of winding around |
| | Kind | adding | adding | A | B | C | temperature | Temperature | Time | for core | the core |
| Example 1 | BaFe | Added | Added | 1.0 | 1.0 | 0.0 | 90° C. | None | None | None | None |
| Example 2 | BaFe | Added | Added | 1.0 | 1.0 | 0.0 | 95° C. | None | None | None | None |
| Example 3 | BaFe | Added | Added | 1.0 | 1.0 | 0.0 | 100° C. | None | None | None | None |
| Example 4 | BaFe | Added | Added | 1.0 | 1.0 | 0.0 | 105° C. | None | None | None | None |
| Example 5 | BaFe | Added | Added | 1.0 | 1.0 | 0.0 | 110° C. | None | None | None | None |
| Example 6 | BaFe | Added | Added | 4.0 | 3.0 | 1.0 | 90° C. | None | None | None | None |
| Example 7 | BaFe | Added | Added | 3.0 | 3.0 | 1.0 | 90° C. | None | None | None | None |
| Example 8 | BaFe | Added | Added | 6.0 | 4.0 | 1.0 | 90° C. | None | None | None | None |
| Example 9 | BaFe | Added | Added | 6.0 | 2.0 | 1.0 | 90° C. | None | None | None | None |
| Example 10 | BaFe | Added | Added | 6.0 | 3.0 | 2.0 | 90° C. | None | None | None | None |
| Example 11 | BaFe | Added | Added | 3.0 | 5.0 | 3.5 | 90° C. | None | None | None | None |
| Example 12 | BaFe | Added | Added | 9.5 | 1.0 | 0.5 | 90° C. | None | None | None | None |
| Example 13 | BaFe | Added | Added | 3.0 | 1.5 | 1.5 | 90° C. | None | None | None | None |
| Example 14 | BaFe | Added | Added | 4.0 | 2.0 | 2.5 | 90° C. | None | None | None | None |
| Example 15 | BaFe | Added | Added | 4.0 | 3.5 | 2.5 | 90° C. | None | None | None | None |
| Example 16 | SrFe1 | Added | Added | 6.0 | 3.0 | 1.0 | 90° C. | None | None | None | None |
| Example 17 | SrFe2 | Added | Added | 6.0 | 3.0 | 1.0 | 90° C. | None | None | None | None |
| Example 18 | ε-iron oxide | Added | Added | 6.0 | 3.0 | 1.0 | 90° C. | None | None | None | None |
| Example 19 | BaFe | Added | Added | 3.0 | 3.0 | 1.0 | 110° C. | 50° C. | 5 hours | 0.8 GPa | 0.6N |
| Example 20 | BaFe | Added | Added | 3.0 | 3.0 | 1.0 | 110° C. | 60° C. | 5 hours | 0.8 GPa | 0.6N |
| Example 21 | BaFe | Added | Added | 3.0 | 3.0 | 1.0 | 110° C. | 70° C. | 5 hours | 0.8 GPa | 0.6N |
| Example 22 | BaFe | Added | Added | 3.0 | 3.0 | 1.0 | 110° C. | 70° C. | 15 hours | 0.8 GPa | 0.8N |

| | AlFeSil abrasion value$_{45°}$ (μm) | Standard deviation of the AlFeSil abrasion value (μm) | Standard deviation of curvature (mm/m) | SNR reduction amount (dB) | Magnetic layer surface Ra (nm) | SNR (dB) |
|---|---|---|---|---|---|---|
| Example 1 | 20 | 30 | 6 | 0.6 | 2.0 | 2.0 |
| Example 2 | 20 | 30 | 6 | 0.6 | 1.8 | 2.5 |
| Example 3 | 20 | 30 | 6 | 0.6 | 1.7 | 3.0 |
| Example 4 | 20 | 30 | 6 | 0.6 | 1.5 | 3.5 |
| Example 5 | 20 | 30 | 6 | 0.6 | 1.3 | 4.0 |
| Example 6 | 25 | 30 | 6 | 0.8 | 2.0 | 2.0 |
| Example 7 | 30 | 25 | 6 | 0.9 | 2.0 | 2.0 |
| Example 8 | 37 | 18 | 6 | 0.8 | 2.0 | 2.0 |
| Example 9 | 32 | 20 | 6 | 0.6 | 2.0 | 2.0 |
| Example 10 | 40 | 18 | 6 | 0.8 | 2.0 | 2.0 |
| Example 11 | 50 | 30 | 6 | 0.9 | 2.0 | 2.0 |
| Example 12 | 30 | 20 | 6 | 0.7 | 2.0 | 2.0 |
| Example 13 | 35 | 22 | 6 | 0.8 | 2.0 | 2.0 |
| Example 14 | 50 | 25 | 6 | 0.4 | 2.0 | 2.0 |
| Example 15 | 50 | 25 | 6 | 0.5 | 2.0 | 2.0 |
| Example 16 | 28 | 18 | 6 | 0.6 | 2.0 | 2.0 |
| Example 17 | 28 | 18 | 6 | 0.6 | 2.0 | 2.0 |
| Example 18 | 30 | 15 | 6 | 0.6 | 2.0 | 2.0 |
| Example 19 | 30 | 25 | 5 | 0.6 | 1.3 | 4.0 |
| Example 20 | 30 | 25 | 4 | 0.4 | 1.3 | 4.0 |
| Example 21 | 30 | 25 | 3 | 0.4 | 1.3 | 4.0 |
| Example 22 | 30 | 25 | 2 | 0.3 | 1.3 | 4.0 |

TABLE 2-2

| | Magnetic layer forming composition | | | | | | Heat treatment conditions | | | | |
|---|---|---|---|---|---|---|---|---|---|---|---|
| | Ferro-magnetic powder Kind | Polyethyl-eneimine Present or absent of adding | Stearic acid Present or absent of adding | Abrasive amount (parts) A | B | C | Calendar process Calendar temperature | Temperature | Time | Bending elastic modulus for core | Tension in case of winding around the core |
| Comparative Example 1 | BaFe | None | Added | 0.0 | 0.0 | 3.0 | 80° C. | None | None | None | None |
| Comparative Example 2 | BaFe | None | Added | 0.0 | 0.0 | 5.0 | 80° C. | None | None | None | None |
| Comparative Example 3 | BaFe | None | Added | 0.0 | 0.0 | 10.0 | 80° C. | None | None | None | None |
| Comparative Example 4 | BaFe | None | Added | 0.0 | 0.0 | 15.0 | 80° C. | None | None | None | None |
| Comparative Example 5 | BaFe | None | Added | 7.0 | 4.0 | 3.0 | 80° C. | None | None | None | None |
| Comparative Example 6 | BaFe | None | Added | 6.0 | 3.0 | 1.0 | 80° C. | None | None | None | None |
| Comparative Example 7 | BaFe | Added | Added | 7.0 | 4.0 | 3.0 | 80° C. | None | None | None | None |
| Comparative Example 8 | BaFe | Added | Added | 1.0 | 0.5 | 0.0 | 80° C. | None | None | None | None |
| Comparative Example 9 | BaFe | Added | Added | 0.5 | 0.5 | 0.0 | 80° C. | None | None | None | None |
| Comparative Example 10 | BaFe | Added | Added | 0.0 | 0.5 | 0.0 | 80° C. | None | None | None | None |
| Comparative Example 11 | BaFe | Added | Added | 1.0 | 1.0 | 0.0 | 80° C. | None | None | None | None |
| Comparative Example 12 | BaFe | Added | Added | 4.0 | 3.0 | 1.0 | 90° C. | None | None | None | None |
| Comparative Example 13 | BaFe | Added | Added | 3.0 | 3.0 | 1.0 | 90° C. | None | None | None | None |
| Comparative Example 14 | BaFe | Added | Added | 6.0 | 4.0 | 1.0 | 90° C. | None | None | None | None |
| Comparative Example 15 | BaFe | Added | Added | 6.0 | 2.0 | 1.0 | 90° C. | None | None | None | None |
| Comparative Example 16 | BaFe | Added | Added | 6.0 | 3.0 | 2.0 | 90° C. | None | None | None | None |
| Comparative Example 17 | BaFe | Added | Added | 3.0 | 5.0 | 3.5 | 90° C. | None | None | None | None |
| Comparative Example 18 | BaFe | Added | Added | 9.5 | 1.0 | 0.5 | 90° C. | None | None | None | None |
| Comparative Example 19 | BaFe | Added | Added | 3.0 | 1.5 | 1.5 | 90° C. | None | None | None | None |
| Comparative Example 20 | BaFe | Added | Added | 4.0 | 2.0 | 2.5 | 90° C. | None | None | None | None |
| Comparative Example 21 | BaFe | Added | Added | 4.0 | 3.5 | 2.5 | 90° C. | None | None | None | None |
| Comparative Example 22 | SrFe1 | Added | Added | 6.0 | 3.0 | 1.0 | 90° C. | None | None | None | None |
| Comparative Example 23 | SrFe2 | Added | Added | 6.0 | 3.0 | 1.0 | 90° C. | None | None | None | None |
| Comparative Example 24 | ε-iron oxide | Added | Added | 6.0 | 3.0 | 1.0 | 90° C. | None | None | None | None |
| Comparative Example 25 | BaFe | Added | Added | 3.0 | 3.0 | 1.0 | 110° C. | 50° C. | 5 hours | 0.8 GPa | 0.6N |
| Comparative Example 26 | BaFe | Added | Added | 3.0 | 3.0 | 1.0 | 110° C. | 60° C. | 5 hours | 0.8 GPa | 0.6N |
| Comparative Example 27 | BaFe | Added | Added | 3.0 | 3.0 | 1.0 | 110° C. | 70° C. | 5 hours | 0.8 GPa | 0.6N |
| Comparative Example 28 | BaFe | Added | Added | 3.0 | 3.0 | 1.0 | 110° C. | 70° C. | 15 hours | 0.8 GPa | 0.8N |

| | AlFeSil abrasion value$_{45°}$ (μm) | Standard deviation of the AlFeSil abrasion value (μm) | Standard deviation of curvature (mm/m) | SNR reduction amount (dB) | Magnetic layer surface Ra (nm) | SNR (dB) |
|---|---|---|---|---|---|---|
| Comparative Example 1 | 52 | 32 | 6 | 1.5 | 2.2 | 0 |
| Comparative Example 2 | 60 | 35 | 6 | 1.8 | 2.2 | 0 |
| Comparative Example 3 | 73 | 35 | 6 | 1.9 | 2.2 | 0 |

TABLE 2-2-continued

| | | | | | | | |
|---|---|---|---|---|---|---|---|
| Comparative Example 4 | 79 | 36 | 6 | 2.0 | 2.2 | 0 | |
| Comparative Example 5 | 70 | 32 | 6 | 1.6 | 2.2 | 0 | |
| Comparative Example 6 | 53 | 32 | 6 | 1.6 | 2.2 | 0 | |
| Comparative Example 7 | 52 | 35 | 6 | 1.5 | 2.2 | 0 | |
| Comparative Example 8 | 19 | 10 | 6 | 2.2 | 2.2 | 0 | |
| Comparative Example 9 | 10 | 5 | 6 | 2.5 | 2.2 | 0 | |
| Comparative Example 10 | 5 | 5 | 6 | 3.0 | 2.2 | 0 | |
| Comparative Example 11 | 20 | 30 | 6 | 0.6 | 2.2 | 0 | |
| Comparative Example 12 | 25 | 30 | 6 | 0.8 | 2.2 | 0 | |
| Comparative Example 13 | 30 | 25 | 6 | 0.9 | 2.2 | 0 | |
| Comparative Example 14 | 37 | 18 | 6 | 0.8 | 2.2 | 0 | |
| Comparative Example 15 | 32 | 20 | 6 | 0.6 | 2.2 | 0 | |
| Comparative Example 16 | 40 | 18 | 6 | 0.8 | 2.2 | 0 | |
| Comparative Example 17 | 50 | 30 | 6 | 0.9 | 2.2 | 0 | |
| Comparative Example 18 | 30 | 20 | 6 | 0.7 | 2.2 | 0 | |
| Comparative Example 19 | 35 | 22 | 6 | 0.8 | 2.2 | 0 | |
| Comparative Example 20 | 50 | 25 | 6 | 0.4 | 2.2 | 0 | |
| Comparative Example 21 | 50 | 25 | 6 | 0.5 | 2.2 | 0 | |
| Comparative Example 22 | 28 | 18 | 6 | 0.6 | 2.2 | 0 | |
| Comparative Example 23 | 28 | 18 | 6 | 0.6 | 2.2 | 0 | |
| Comparative Example 24 | 30 | 15 | 6 | 0.6 | 2.2 | 0 | |
| Comparative Example 25 | 30 | 25 | 5 | 0.6 | 2.2 | 0 | |
| Comparative Example 26 | 30 | 25 | 4 | 0.4 | 2.2 | 0 | |
| Comparative Example 27 | 30 | 25 | 3 | 0.4 | 2.2 | 0 | |
| Comparative Example 28 | 30 | 25 | 2 | 0.3 | 2.2 | 0 | |

From the results shown in Table 2, it can be confirmed that the magnetic tape of the examples in which the magnetic layer surface Ra is 2.0 nm or less exhibited excellent electromagnetic conversion characteristics (high SNR).

In addition, from the results shown in Table 2, it can be confirmed that, in the magnetic tapes of examples in which the AlFeSil abrasion value$_{45°}$ and the standard deviation of the AlFeSil abrasion value are in the ranges described above, the deterioration in electromagnetic conversion characteristics in a case where the magnetic tape was caused to run at different head tilt angle was suppressed.

Six magnetic tape cartridges were manufactured in the same manner as described in Example 1, except that the thickness of the non-magnetic support was changed to 3.9 μm and thus the tape thickness was 5.0 Among the six magnetic tape cartridges, one was used for the evaluation of electromagnetic conversion characteristics described above, another one was used for the evaluation regarding the deterioration in electromagnetic conversion characteristics described above, and the other four were used for the evaluations (1) to (4) of the magnetic tape described above. The evaluation results thus obtained were similar to those of Example 1.

Six magnetic tape cartridges were manufactured in the same manner as described in Example 1, except that the thickness of the non-magnetic support was changed to 3.7 μm and thus the tape thickness was 4.8 Among the six magnetic tape cartridges, one was used for the evaluation of electromagnetic conversion characteristics described above, another one was used for the evaluation regarding the deterioration in electromagnetic conversion characteristics described above, and the other four were used for the evaluations (1) to (4) of the magnetic tape described above. The evaluation results thus obtained were similar to those of Example 1.

A sample piece was cut out from the magnetic tape taken out from the magnetic tape cartridge of Example 1. For this sample piece, a vertical squareness ratio was measured by the method described above using a TM-TRVSM5050-SMSL type manufactured by Tamagawa Seisakusho Co., Ltd. as an oscillation sample type magnetic-flux meter. The vertical squareness ratio thus measured was 0.60.

The magnetic tape cartridge P-1 was manufactured in the same manner as in Example 1, except that a magnetic field strength in the homeotropic alignment process was changed to 0.5 T. A sample piece was cut out from the magnetic tape taken out from the magnetic tape cartridge P-1. For this sample piece, a vertical squareness ratio was measured in the same manner as described above. The vertical squareness ratio thus measured was 0.65.

Each of the above two magnetic tapes was attached to each of the ½-inch reel testers, and the electromagnetic conversion characteristics (signal-to-noise ratio (SNR)) were evaluated by the following methods. As a result, regarding the magnetic tape taken out from the magnetic tape cartridge P-1, a value of SNR 2 dB higher than that of the magnetic tape of Example 1.

In an environment of a temperature of 23° C. and a relative humidity of 50%, a tension of 0.7 N was applied in the longitudinal direction of the magnetic tape, and recording and reproduction were performed for 10 passes. A relative speed of the magnetic head and the magnetic tape was set as 6 m/sec. The recording was performed by using a metal-in-gap (MIG) head (gap length of 0.15 μm, track width of 1.0 μm) as the recording head and by setting a recording current as an optimal recording current of each magnetic tape. The reproduction was performed using a giant-magnetoresistive (GMR) head (element thickness of 15 nm, shield interval of 0.1 μm, reproducing element width of 0.8 μm) as the reproduction head. The head tilt angle was set to 0°. A signal having a linear recording density of 300 kfci was recorded, and the reproduction signal was measured with a spectrum analyzer manufactured by ShibaSoku Co., Ltd. In addition, the unit kfci is a unit of linear recording density (cannot be converted to SI unit system). As the signal, a sufficiently stabilized portion of the signal after starting the running of the magnetic tape was used.

One aspect of the invention is advantageous in a technical field of various data storages.

What is claimed is:

1. A magnetic tape comprising:
    a non-magnetic support; and
    a magnetic layer containing a ferromagnetic powder, wherein
    the non-magnetic support is polyethylene terephthalate, polyethylene naphthalate, or polyamide,
    an arithmetic average roughness Ra measured at a surface of the magnetic layer with an atomic force microscope is 2.0 nm or less, and
    in an environment with a temperature of 23° C. and a relative humidity of 50%,
    an AlFeSil abrasion value$_{45°}$ of a surface of the magnetic layer measured at a tilt angle of 45° of an AlFeSil prism is 20 μm to 50 μm,
    a standard deviation of an AlFeSil abrasion value of the surface of the magnetic layer measured at each of tilt angles of 0°, 15°, 30°, and 45° of the AlFeSil prism is 30 μm or less, and
    the tilt angle of the AlFeSil prism is an angle formed by a longitudinal direction of the AlFeSil prism and a width direction of the magnetic tape.

2. The magnetic tape according to claim 1,
    wherein the standard deviation of the AlFeSil abrasion value is 15 μm to 30 μm.
3. The magnetic tape according to claim 1,
    wherein the arithmetic average roughness Ra is 1.0 nm to 2.0 nm.
4. The magnetic tape according to claim 1,
    wherein a standard deviation of curvature of the magnetic tape in a longitudinal direction is 5 mm/m or less.
5. The magnetic tape according to claim 1,
    wherein the magnetic layer contains one or more kinds of non-magnetic powder.
6. The magnetic tape according to claim 5,
    wherein the non-magnetic powder contains an alumina powder.
7. The magnetic tape according to claim 1, further comprising:
    a non-magnetic layer containing a non-magnetic powder between the non-magnetic support and the magnetic layer.
8. The magnetic tape according to claim 7,
    wherein a thickness of the non-magnetic layer is 0.1 μm to 0.7 μm.
9. The magnetic tape according to claim 1, further comprising:
    a back coating layer containing a non-magnetic powder on a surface side of the non-magnetic support opposite to a surface side provided with the magnetic layer.
10. The magnetic tape according to claim 1,
    wherein a tape thickness is 5.2 μm or less.
11. The magnetic tape according to claim 1,
    wherein a tape thickness is 5.0 μm or less.
12. The magnetic tape according to claim 1,
    wherein a vertical squareness ratio of the magnetic tape is 0.60 or more.
13. The magnetic tape according to claim 1,
    wherein a vertical squareness ratio of the magnetic tape is 0.65 or more.
14. A magnetic tape cartridge comprising:
    the magnetic tape according to claim 1.
15. A magnetic tape device comprising:
    the magnetic tape according to claim 1.
16. The magnetic tape device according to claim 15, further comprising:
    a magnetic head,
    wherein the magnetic head includes a module including an element array having a plurality of magnetic head elements between a pair of servo signal reading elements, and
    the magnetic tape device changes an angle θ formed by an axis of the element array with respect to the width direction of the magnetic tape during running of the magnetic tape in the magnetic tape device.

* * * * *